United States Patent
Linde et al.

(10) Patent No.: US 10,693,903 B2
(45) Date of Patent: *Jun. 23, 2020

(54) METHOD AND APPARATUS FOR DATA SECURITY ANALYSIS OF DATA FLOWS

(71) Applicant: IOR Analytics, LLC., Houston, TX (US)

(72) Inventors: Matthew Michael Linde, Houston, TX (US); Daniel Jonghoon Kim, Fairfax, VA (US); Erik Wells, Holly Springs, NC (US)

(73) Assignee: IOR Analytics, LLC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/232,816

(22) Filed: Dec. 26, 2018

(65) Prior Publication Data

US 2019/0132351 A1 May 2, 2019

Related U.S. Application Data

(63) Continuation-in-part of application No. 15/225,289, filed on Aug. 1, 2016, now Pat. No. 10,198,582.

(Continued)

(51) Int. Cl.
*H04L 29/06* (2006.01)
*H04L 12/24* (2006.01)
(Continued)

(52) U.S. Cl.
CPC .......... *H04L 63/1433* (2013.01); *G06F 11/30* (2013.01); *G06F 12/00* (2013.01); *G06F 16/2358* (2019.01); *G06F 16/2379* (2019.01); *G06F 21/577* (2013.01); *H04L 41/22* (2013.01); *H04L 63/1416* (2013.01)

(58) Field of Classification Search
None
See application file for complete search history.

(56) References Cited

U.S. PATENT DOCUMENTS

| 8,429,545 | B2 * | 4/2013 | Dixon | G06Q 10/06 715/760 |
| 8,910,288 | B2 * | 12/2014 | Young | G06F 21/552 726/24 |

(Continued)

OTHER PUBLICATIONS

Shah, Vrushank; Aggarwal, A.K. Heterogeneous Fusion of IDS alerts for Detecting DOS Attacks. 2015 International Conference on Computing Communication Control and Automation. https://ieeexplore.ieee.org/stamp/stamp.jsp?tp=&arnumber=7155825 (Year: 2015).*

(Continued)

*Primary Examiner* — Jeremiah L Avery
(74) *Attorney, Agent, or Firm* — Ditthavong & Steiner, P.C.

(57) ABSTRACT

A method and apparatus useful for data risk monitoring and management includes configuration and analysis of data flows to identify and assess risk and compliance to various regulatory standards and business practices. The evaluation of monitored data flows are then further used to identify potential security risks based on deviation from expected flows or compliant handling methods.

20 Claims, 20 Drawing Sheets

Related U.S. Application Data

(60) Provisional application No. 62/198,994, filed on Jul. 30, 2015.

(51) Int. Cl.
    *G06F 16/23*     (2019.01)
    *G06F 11/30*     (2006.01)
    *G06F 12/00*     (2006.01)
    *G06F 21/57*     (2013.01)

(56) References Cited

U.S. PATENT DOCUMENTS

| | | | | |
|---|---|---|---|---|
| 9,436,820 | B1* | 9/2016 | Gleichauf | G06F 21/50 |
| 2006/0212931 | A1* | 9/2006 | Shull | G06F 21/55 726/10 |
| 2007/0061266 | A1* | 3/2007 | Moore | G06Q 50/00 705/51 |
| 2008/0222734 | A1* | 9/2008 | Redlich | G06F 21/577 726/26 |
| 2010/0325418 | A1* | 12/2010 | Kanekar | H04L 63/0823 713/151 |
| 2011/0126111 | A1* | 5/2011 | Gill | G06F 21/55 715/736 |
| 2011/0154017 | A1* | 6/2011 | Edstrom | H04L 63/0823 713/151 |
| 2011/0154026 | A1* | 6/2011 | Edstrom | H04L 63/0823 713/158 |
| 2012/0137367 | A1* | 5/2012 | Dupont | G06F 21/00 726/25 |
| 2014/0094159 | A1* | 4/2014 | Raleigh | H04W 24/02 455/418 |

OTHER PUBLICATIONS

Campos, Marcos M.; Milenova, Boriana L. Creation and Deployment of Data Mining-Based Intrusion Detection Systems in Oracle Database 10g. Fourth International Conference on Machine Learning and Applications (ICMLA '05). https://ieeexplore.ieee.org/stamp/stamp.jsp?tp=&arnumber=1607438 (Year: 2005).*

Kotenko, Igor; Chechulin, Andrey. Computer Attack Modeling and Security Evaluation based on Attack Graphs. 2013 IEEE 7th International Conference on Intelligent Data Acquistion and Advanced Computing Systems (IDAACS). https://ieeexplore.ieee.org/stamp/stamp.jsp?tp=&arnumber=6662998 (Year: 2013).*

Ou, Xinming et al. An Empirical Approach to Modeling Uncertainty in Intrusion Analysis. 2009 Annual Computer Security Applications Conference. https://ieeexplore.ieee.org/stamp/stamp.jsp?tp=&arnumber=5380706 (Year: 2009).*

Lee, Dong Hwi et al. Standardization Model and Implementation of Event Type in Real Time Cyber Threats. 2008 International Conference on Convergence and Hybrid Information Technology. https://ieeexplore.ieee.org/stamp/stamp.jsp?tp=&arnumber=4622930 (Year: 2008).*

R, Chetan; D.V., Ashoka. Data Mining Based Network Intrusion Detection System: A Database Centric Approach. 2012 International Conference on Computer Communication and Informatics. https://ieeexplore.ieee.org/stamp/stamp.jsp?tp=&arnumber=6158816 (Year: 2012).*

Zonouz, Saman A. et al. Seclius: An Information Flow-Based, Consequence-Centric Security Metric. IEEE Transactions on Parallel and Distributed Systems, vol. 26, Issue: 2. https://ieeexplore.ieee.org/stamp/stamp.jsp?tp=&arnumber=6547151 (Year: 2015).*

\* cited by examiner

FIG. 10B

| Flow Visualization | Flow Steps | About |

New | Insert | Copy | Paste | Delete

Add: System Department Vendor Data Type Transmit Method

| Step | Resource | Event | Action | Data Type | Resource | Transmit Method |
|---|---|---|---|---|---|---|
| 1 | (Generic) Employee | Manual | Push | Vendor Purchase Requisition | SAP SCM | RDP - Default |
| 2 | SAP SCM | Auto | Push | Notification - PO Approval Req (Generic) Manager | | Email - Corporate - Unencrypt |
| 3 | (Generic) Manager | Manual | Push | Approval - Purchase Order | SAP SCM | RDP - Default |
| 4 | SAP SCM | Auto | Push | Notification - Generic | Supply Chain Management (S)Email - Corporate - Unencrypt |
| 5 | Supply Chain Management (S)Manual | | Push | Request for Quotation (RFQ) | SAP SCM | RDP - Default |
| 6 | SAP SCM | Auto | Push | Account Setup Data - ADP | Supply Chain Management (S)RDP - Default |
| 7 | Supply Chain Management (S)Manual | | Push | -Voter's Registration Card | | Encrypted - SSL/TLS v1.2 |
| 8 | Iasta | Auto | Push | -Wire Transfer Data (to Business Acct.) | arty Vendor | Email - Corporate - Unencrypt |
| 9 | (Generic) Third Party Vendor Manual | | Push | -Wire Transfer Data (to Personal Acct.) | | Encrypted - SSL/TLS v1.2 |
| 10 | Supply Chain Management (S)Manual | | Pull | Account Setup Data - Active Directory | | Encrypted - SSL/TLS v1.2 |
| 11 | Supply Chain Management (S)Manual | | Push | Account Setup Data - ADP | arty Vendor | Email - Corporate - Unencrypt |
| 12 | Supply Chain Management (S)Manual | | Push | Account Setup Data - BenefitSolver | arty Vendor | Telecom - Direct Phone Call |
| 13 | Supply Chain Management (S)Manual | | Push | Account Setup Data - Concur | arty Vendor | In-Person Meeting |
| 14 | Supply Chain Management (S)Manual | | Push | Notification - Bid Rejection | (Generic) Third Party Vendor | Email - Corporate - Unencrypt |
| 15 | Supply Chain Management (S)Manual | | Push | Notification - Bid Selection | (Generic) Third Party Vendor | Email - Corporate - Unencrypt |

FIG. 10E

Data Classification Levels

+ New    ✏ Edit    🗑 Delete

[search by name] 🔍

Per Page 25    Total: 4

| | Name | Severity ∧ | Description |
|---|---|---|---|
| ☐ | Public | 0 | Information that may be disclosed to anyone whether inside or outside the company, and has been authorized by a company representative for external distribution. |
| ☐ | Internal Only | 1 | Information accessible by company personnel, but not approved for external distribution. While unauthorized access is not expected to cause significant harm to the company, this information is not public, and access should be limited appropriately. |
| ☐ | Confidential | 2 | Information that is not appropriate for public disclosure or broad internal distribution, due to the competitive advantage it provides or the legal, security or privacy interests of the organization. |
| ☐ | Top Secret | 3 | This designation is limited to the most sensitive data. Highly proprietary or sensitive information that, if disclosed to unauthorized parties would cause significant harm to the organization. |

Viewing 4 of 4 Results

FIG. 10G

Data Elements

| Name ▴ | Classification |
|---|---|
| Customer's Social Security Number (SSN) | Highly Confidential |
| Customer's Soft or Logical Security Token | Confidential |
| Customer's State ID Number | Highly Confidential |
| Customer's Swift Code | Public Authorized |
| Customer's Telephone/Conference Call Recordings | Confidential |
| Customer's Trade Secrets | Confidential |
| Customer's Transaction History | Confidential |
| Customer's Transaction Number | Confidential |
| Customer's Truncated (Last 4 Only) Card Number | Confidential |
| Customer's User Account ID | Confidential |
| Customer's User Account Password | Confidential |
| Customer's Vehicle Identification Number (VIN) | Confidential |
| Customer's Work Eligibility/I-9 Account ID | Highly Confidential |
| Data Flow Diagram | Highly Confidential |
| Department's Credit Card Brand/Type | Confidential |

Per Page 25   Total: 358

METHOD AND APPARATUS FOR DATA SECURITY ANALYSIS OF DATA FLOWS

RELATED APPLICATIONS

This application is a continuation-in-part of U.S. patent application Ser. No. 15/225,289, filed Aug. 1, 2016, entitled "Method and Apparatus for Data Security Analysis of Data Flows," which claims the benefit of the earlier filing date under 35 U.S.C. § 119(e) of U.S. Provisional Application Ser. No. 62/198,994 filed Jul. 30, 2015, entitled "Software to Document and Certify Sensitive Data Flows and Produces Indicators of Business Risks"; which are incorporated herein by reference in their entireties.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD

The disclosure relates to information or data security. In particular, the disclosure relates to data security assessment, management, and methods thereof.

BACKGROUND

Related art data security approaches include processes that are intended to prevent data loss. Such processes determine how an enterprise uses information by collecting data, typically in repositories in data center(s), monitoring outbound traffic from the data center(s), and analyzing the data usage by the enterprise to determine a potential for data loss or threat to data integrity for preventing data loss.

Related art data security approaches also include processes for determining behavioral anomalies with respect to data usage by users. Such processes include steps of determining and storing a reference or "normal" profile for a user of the data, and in some processes, forming a user profile based on the determination. The reference profile, or the user profile, may be compared with monitored data usage or day-to-day data interactions to detect behavioral anomalies. An enterprise, or an owner or custodian of the data may be informed of behavioral anomalies, and may be alerted thereto based on the detection.

While related art data loss protection solutions identify data interactions, the interactions are typically not necessarily attributable to business processes, and do not expose or provide context as to why such data interactions are occurring, and whether or not the interactions are permitted or sanctioned by an enterprise, owner, or custodian of the data. Moreover, while behavioral anomaly detection solutions examine system activities and data usage to reveal when users perform activities outside those reflected by normal user profiles, for example, they provide no context for the business process or entity policy driving such behavior. Thus, data security management professionals confront difficulty in managing and prioritizing data security risks for enterprises having varying and evolving sets of environmental variables.

The information security community has recently embraced the notion of capturing data within an organization to better understand where risks may lurk and where to focus data assessment efforts. In particular, the recently deployed Payment Card Industry (PCI) Data Security Standard (DSS) and recently published National Institute of Standards and Technology (NIST) Cybersecurity Framework both require documentation of sensitive data flows to fully satisfy requirements.

SUMMARY

It has been recognized, however, that gathering data flows and managing their lifecycles is resource intensive, and the capability of obtaining valuable output from such gathering and managing, or mining the captured data flows for information about risks and their prioritization, is needed. Related art systems rely on disparate tools used by security and risk analysts that provide minimal insight into data risk, and the insight that is provided typically does not extend beyond a discrete point in time. Related art methods and systems rely principally on general office productivity software that is incapable of: a) exposing relationships between data, b) auditing of data flow modifications, c) executing algorithms to identify data breach risks, d) determining control gaps resulting from enterprise policy or personnel changes and identified system vulnerabilities, and e) scheduling attestations and other compliance-related activities to work in concert to produce a cohesive system.

Methods and apparatus of embodiments provided herein address the problems confronted by related art solutions by leveraging cloud services, user devices, and/or minimizing computer processing and data storage resource requirements through improved data flow capture, analysis, and management.

According to another embodiment, an apparatus comprises at least one processor, and at least one memory including computer program code, the at least one memory and the computer program code configured to, with the at least one processor, cause the apparatus to perform at least the following, establish communication with a plurality of monitoring systems, wherein each of the monitoring systems is disparate from one another; aggregate alerts from the plurality of monitoring, wherein the alerts relate to use, storage, transmission, deletion or processing of data from the plurality of monitoring systems; determine one or more uniform data flow steps by standardizing the aggregated alerts; and store the one or more uniform data flow steps in a central database that is external to the plurality of monitoring systems.

For various example embodiments of the invention, the following is also applicable: a method comprising: assigning a policy to a data element associated with a data flow, wherein the data flow includes one or more data flow steps specifying usage of the data element, the policy being associated with a classification level for the data element; determining a data flow configuration according to the classification level involving how the data element is processed by a plurality of processing nodes; determining an expected sequence of the processing nodes that will interact with the data element according to the data flow configuration; monitoring an observed sequence of the processing nodes based on detected processing of the data element; and comparing the observed sequence with the expected sequence to identify a potential security issue.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 10A-H are diagrams of user interfaces for data risk management, according to one embodiment;

DETAILED DESCRIPTION

Examples of a method, apparatus, and computer program for updating, managing, and searching one or more databases are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. The present disclosure addresses and solves problems associated with related art data security risk assessment and management. Methods and apparatus of embodiments provide structured, step-wise, user-friendly entry of data flow information, linking each step with information pertaining to enterprise systems, vendors, departments within an enterprise associated with the information, an identity of information, a sensitivity of the identified information, an identity of one or more methods with which the information was transmitted or transported, controls with which the enterprise systems are configured, applicable compliance requirements to be applied to each information type, information pertaining to a state of personnel and system vulnerabilities, and security policies and standards by which an organization is governed. The various linked information offers a rich perspective into data risk that is not feasible using related art methods and systems. Furthermore, the application of data flow information to policies and standards reduces additional processing and makes more efficient processing required for determining security risks by reducing the number of applications needed and more quickly identifying the data use practices of a system.

Figure 1:
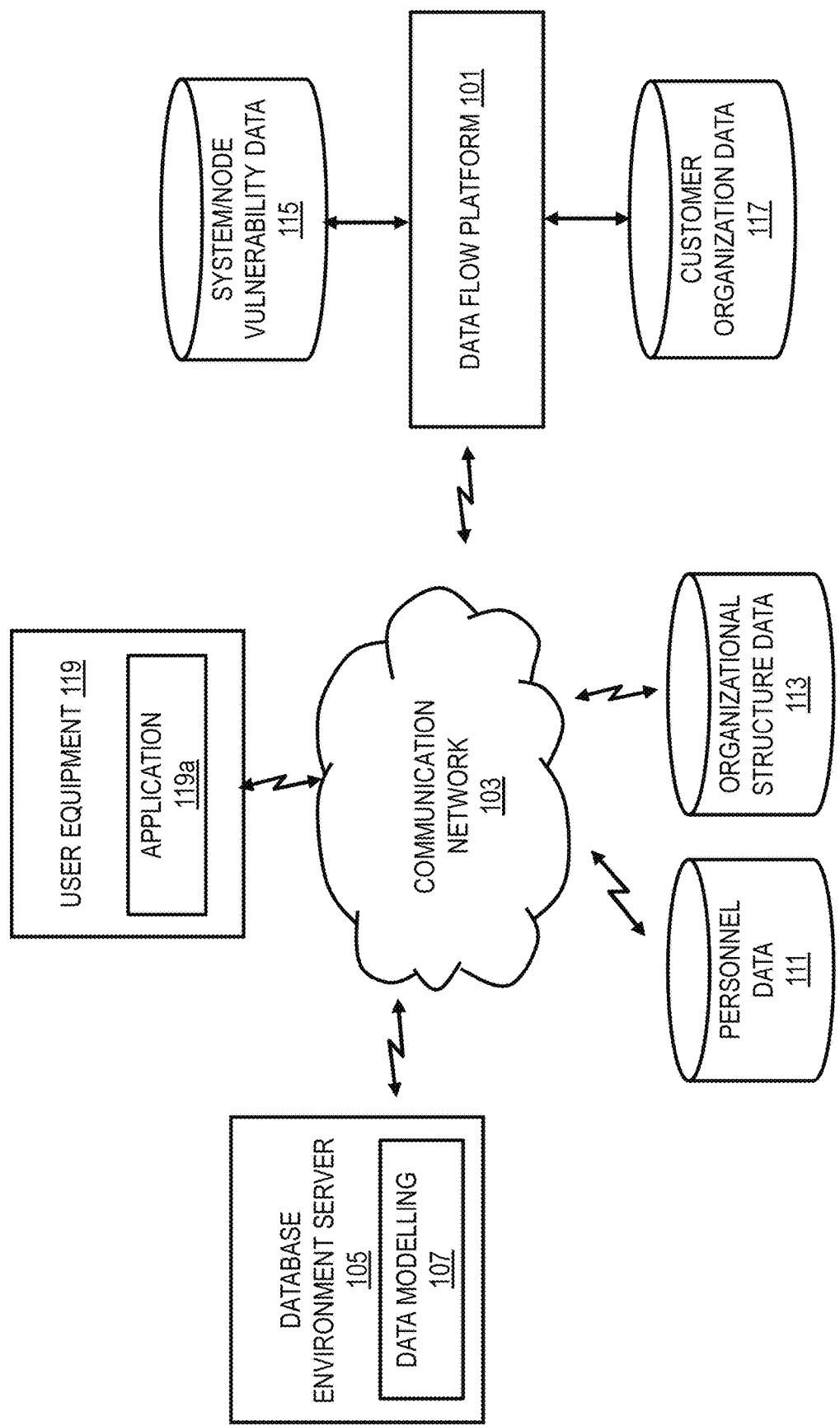
FIG. 1 is a diagram of a system capable of data risk management through data flow analysis, according to one embodiment.

Methods and apparatus in accordance with embodiments may be implemented using systems such as a system 100 shown in FIG. 1. In particular, FIG. 1 is a diagram of a system 100 capable of data risk management through data flow analysis, according to one embodiment, that includes a data flow platform 101. The system 100 includes, in one embodiment, a communication network 103, database environment server 105, and a proprietary data model server 107. The system 100 also may include a proprietary code server and a web application environment server, which may facilitate a user interface, and include logic and may be configured with processes for execution, using one or more processors, of methods in accordance with embodiments.

The system 100 includes, in one embodiment, a personnel input file server 111, an organization structure input file server 113, a system/endpoint vulnerability input file server 115, and a customer organization data server 117. The customer organization data server 117 may be configured to store and/or process data flows, asset inventory, and enterprise data policies, for example. According to one embodiment, a database 121 provides a registry of business processes to serve as a reference for helping determine whether activities detected by the data flow platform 101 are legitimate. Similarly, the database 121 can be a data server.

A client 119 may be configured to communicate with one or more of the platform 101 and/or servers 105, 107, 111, 113, 115, 117, and 121. For example, the client 119 may include an end user workstation, laptop, mobile phone, tablet, phablet, or other end user device. The client 119 may be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the User Equipment (UE) 119 can support any type of interface to the user (such as "wearable" circuitry, etc.).

The data flow platform 101 may be constituted by one instance or multiple instances, depending on scaling needs. The data flow platform 101 may reside, in whole or in part, in a single or multiple locations. The database environment server 103 may reside, in whole or in part, in a single or in multiple locations. The proprietary database model server 107 may reside in the database server 105. The proprietary database model server 107 may be configured to establish links or relationships between data types used in capturing data and processing outputs for consumption.

The web application environment server may include one or more servers and may be configured to facilitate bi-directional communication of web traffic over typical web protocols. The web application environment server may reside, in whole or in part, on the data flow platform 101, depending on scalability and architectural needs.

The proprietary code server may be deployed within the web application environment server, in whole or in part, depending on technological capability and scalability requirements. The proprietary code server may be configured to contain a set of logic for processing data, algorithms for identifying information for human consumption, and interfaces facilitating the lifecycle of data entry, and actions taken by users of an end user workstation or laptop 119. The end user workstation or laptop 119 may be configured and used to access or input information and take action with the proprietary data model server 107, and the proprietary code server.

The personnel input file server 111, the organizational structure input file server 113, the system/node vulnerability input file server 115, and the customer organization data server 117 may be constituted of multiple file types or directly connected to source systems. The files may be accessed on a local file system disposed on the data flow platform 101, or disposed remotely, and may optionally use cloud-based storage technology as now known or later developed. The files may be retrieved, in whole or in part, in parallel or in series, one after the next, in any order. This information may be pushed, in whole or in part, into the proprietary data model server 107 or proprietary code server 109 by way of a software interface.

The components of FIG. 1 may be connected to or by a communication network 103 or one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof. By way of example, the components of the system 100 communicate with each other and other components using well known, new or still developing protocols. By way of example, network connectivity may enable leveraging of cloud storage and computing systems and services.

A "data flow," as the term is used herein, may include one or more data processing or flow steps reflecting data usage by, for example, an enterprise. Each flow step specifies a source and destination, such as systems, departments, vendors, data to be transported, the manner of transport, e.g., push or pull, destroy, and the like, and a method of transfer or protocol, e.g., HTTP, FTP, and the like. The one or more flow steps are customizable or configurable for implementation using, for example, the system disclosed above with respect to FIG. 1, and allowing for information capture specific to a particular enterprise or usage context.

Analysis of data in a data flow relies on logic that considers data types, which contain data elements. Each data elements may be assigned a classification level of severity. If a data element is added to a data type, the data type classification will be determined by the highest severity classification of data elements assigned. On the other hand, if a data element is removed from the data type, the data type classification is updated accordingly.

A "data element," as the term is used herein, is a piece of data that is transmitted as a data type between various nodes within a system, and may include one or more assigned compliance requirements or policies. If a data element has compliance requirements assigned thereto, all uses of that data element are potentially liable for adherence to that compliance requirement, and is a potential source of data risk.

A system within or across one or more enterprises may have one or more controls assigned thereto affecting data usage. A policy may specify what controls a system must assign for a particular classification level or levels of severity. The classification level of a particular data element/type may determine potential data flow configurations to be applied, the initiation of a monitoring of the data element and its data flow, and/or the identifying of security issues based on such as classification. For instance, for data elements with unknown previous data flow configurations, application of a similarly classified data flow configuration could be used to expedite the generation of such data flow configurations. The potential data flow configurations may also be determined by other information such as resource of the data, potential acting nodes, etc. Further, the monitoring of data elements with lower classifications may be unnecessary, whereas data elements with higher severity classifications may be tracked/monitored more. If a system is determined to lack required controls, any flow steps that involve the system and classification of data type transported is evaluated to determine whether a control violation exists. If so, the control violation may be recorded, indicating a real or potential source of risk.

In some embodiments, a policy may specify allowable methods of transporting data. A system may be caused to periodically analyze one or more flow steps to determine whether the transmission method is in accordance with policies set by a user. If not, a violation of policy may be recorded as a data handling violation, indicating a real or potential source of risk. In some embodiments, a compliance policy may further determine a selection of a data flow configuration as compliance to policy recommendations or requirements may establish what methods of transport, which nodes, and/or what use may be made of data elements/types.

A person may be assigned to a department of an enterprise that is associated with a particular flow step. The configurable data flow may be updated accordingly. For example, a person in a finance department responsible for approving payment may be indicated as associated with the approval process, which may pertain to a flow step in a data flow. If a person joins a department that is involved in a flow step, a potential risk may be determined, and recorded, indicating that, for example, possible training requirements, such as social engineering training, may be required.

One or more vulnerabilities may be identified on systems by way of various means, including third party vulnerability scanners, or custom built for-purpose scanners. If a vulnerability is found as a result of such means, and if the system is configured for use with methods and apparatus of embodiments disclosed herein, and the system is involved in a flow step, a record of a possible indicator of risk may be developed and maintained using, for example, one or more components of the system disclosed above with respect to FIG. 1.

Methods and apparatus of embodiments may conveniently be implemented. For example, data flows may be entered electronically with minimal prior setup by using a data flow editor disposed on a user device such as a workstation, laptop, or mobile device, for example. A business person specializing in a particular data flow may provide their view of each step in a flow to capture data handling. This may be completed using previously documented steps available in electronic format, or inputting the results of conversations with individuals. If required elements such as systems, data types, and others are already entered or associated with a system, they may be available for look-up, and automatically populated as a data entry specialist inputs data. If not, the data entry specialist may easily add a necessary item to a look-up database without navigating away from the data flow editor.

Separately and independently, an administrator may configure look-up or reference data in any order. An administrator may receive guidance in setting data classification severity levels, compliance requirements, personnel, and organization data structure at the outset of system configuring methods and apparatus for application to the system. Setup of controls and control policies may enable modeling of the policies for each control against a data classification level.

In some embodiments, a data flow may be assigned to a particular department of an associated enterprise, and/or an owner to help ensure accountability for ongoing maintenance. That ongoing maintenance of data flows may be executed directly due to an external impetus, or through a formal attestation cycle. In such a case, the administrator may select any or all data flows, assign an owner or personnel, and request their participation in the attestation process. There may be multiple options for configuration and notification, as well as configurable email templates for participant with tasks assigned to them.

For risk indicator functionality, after one or more data flows have been configured and electronically captured, a problem may be identified by the solution which then produces meaningful and actionable indicators of risk that security risk management professional can analyze further. The results may be filtered based on a number of criteria and presented in tabular and/or graphical format from various perspectives reflecting data types involved, compliance requirements impacted, classification levels, departments, systems, among others. Activities for managing such risks such as documenting details or mitigating controls or closing risks that have been resolved, are all facilitated by methods and apparatus of embodiments, and an audit trail may document those activities to provide evidence of due diligence or other inquiries.

Methods and apparatus of embodiments may be implemented by building a data model that supports storing of data with relationships intact to make possible determination of associations and compliance requirements ultimately inferred by use of data types in a data flow. By way of example, a web application built on technology such as JAVA EE, .NET, Ruby on Rails, Python, and the like may be used to implement object-relational mapping (ORM) or, if using data warehousing technology, the equivalent mapping to allow the code to interact with the data.

Logic connecting to external data sources may be built into a package of utilities for using the methods and apparatus with a particular system or systems of, for example, an enterprise. A central control layer may be used to handle web traffic; a scheduling layer may be used to establish processes for periodically mining for data risks, pulling information from external data sources, and sending notifications, etc. An interface layer may be used to enable interaction with a user by way of traditional web pages viewed or interpreted in a web browser or through a desktop application, or an application usable on a mobile phone, tablet, phablet, or other mobile user device. All layers may be implemented to leverage proprietary or third party code to complete functional objectives.

The above-described components may benefit from later developed enhancements such as improved connectivity with information sources, connectivity with other data warehouses, or further derivation of information. Additional data such as business continuity data could help further elaborate risks and introduce additional risk indicators that could be mined.

A data model is built around a particular method. Risks may be mined using the if-then logic discussed previously. For example, one could model the data relationships slightly differently, or the indicators slightly differently, such as making data flow risk analysis decentralized from the individual flow steps, and instead centered on other related information, as needed to reveal useful information about data usage. The visualization may be accomplished in many ways so risks can be highlighted in other perspectives depending on user needs over time. For example, in certain embodiments, visualizations combining individual data flows representing portions of business processes may be aggregated into a single view which may be further manipulated based on user defined inputs or search criteria.

Methods and apparatus may enable cloud-based data analytics that use business process information and associated data interactions as inputs, analyze said processes, and provide as an output a listing of data interactions associated with each business process. Further, users or personnel may be provided with data interaction forms that follow proprietary methodology for systematic data interaction entry, for example, by tabular entry of specific sub-components related to each data interaction. User-inputted data interactions may be cross-referenced against security frameworks and/or standards, as well as an enterprise's security control requirements.

Figure 2:
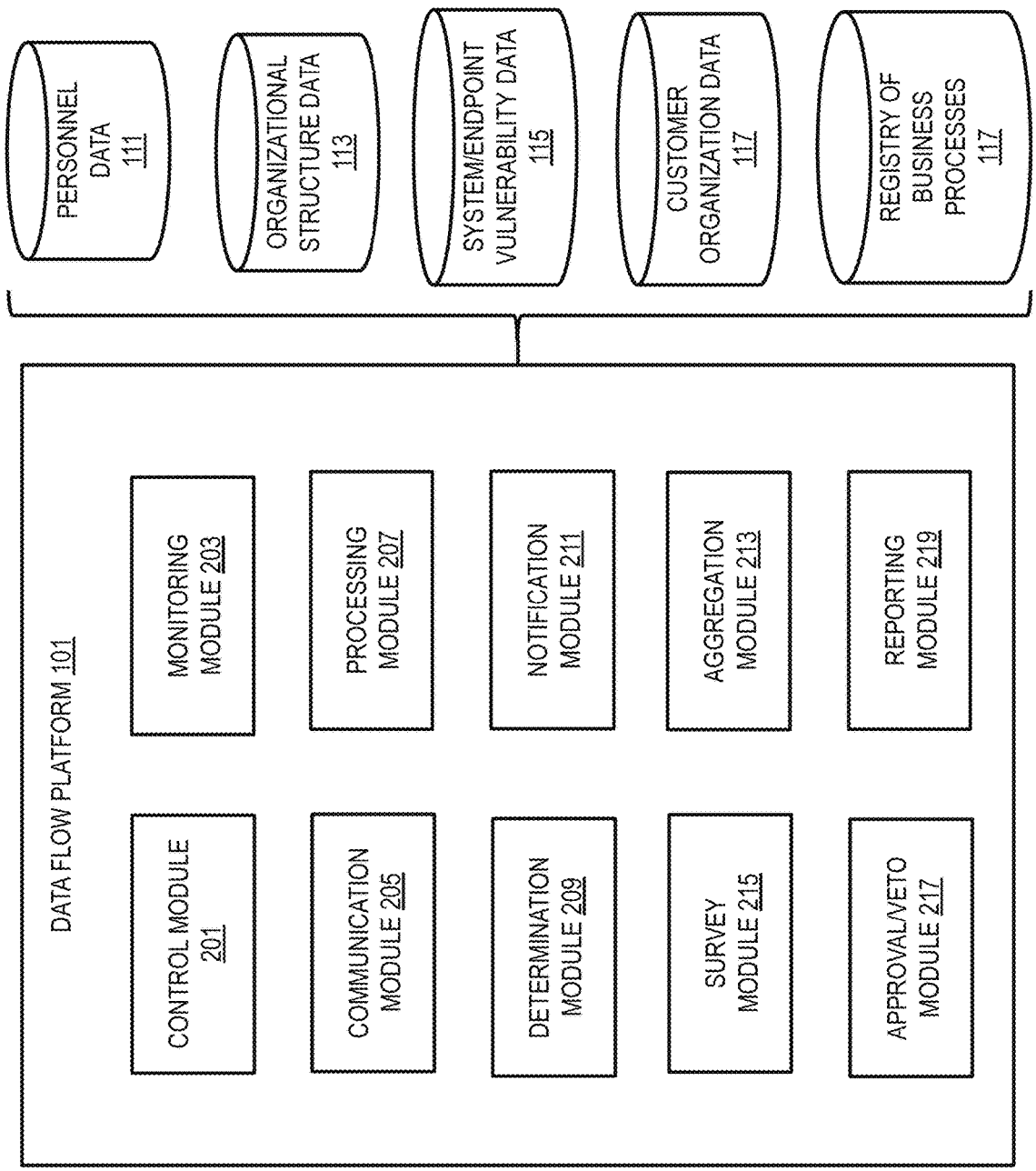
FIG. 2 is a diagram of the components of a data flow platform, according to one embodiment.

FIG. 2 is a diagram of the components of the data flow platform 101, according to one embodiment. By way of example, the data flow platform 101 includes one or more components for providing updating, managing, searching, and retrieving from one or more databases. It is contemplated that the functions of these components may be combined in one or more components or performed by other components of equivalent functionality. In this embodiment, the data flow platform 101 includes a control module 201, a monitoring module 203, a communication module 205, a processing module 207, a determination module 209, a notification module 211, an aggregation module 213, a survey module 215, an approval/veto module 217, and a reporting module 219.

In one embodiment, the data flow platform 101 couples the control module 201 with the other modules to accomplish the processes described. The control module 201 initiates monitoring of nodes within a system via the monitoring module 203. The control module 201 may also configure and manage known data flows based on internal business practices, policies, and compliance with various external standards and recommendations.

In one embodiment, the data flow platform 101 communicates with the file servers/databases 111, 113, 115, and 117 to retrieve, manage, and store information associated with each database as needed in each step of the methods described by way of the communication module 205. The communication module 205 may receive instructions from the control module 201 to retrieve, manage, or store data for various data elements/types and nodes in relation to data flow analysis and management/configuration. The communication module 205 may also provide the data flow platform 101 with the capabilities to communicate with any and all of the other servers of system 100.

In one embodiment, the monitoring module 203 may further retrieve data regarding data flows for processing at the processing module 207 to identify potential risks. The processing module 207 may also retrieve and process configured data flows to determine expected flows. The processing module 207 may also verify data flows through attestation of a user.

In one embodiment, the determination module 209 may be used to determine data element and data type classifications. The determination module 209 may also be used to determine node associations with system structures and personnel.

In one embodiment, the notification module 211 is coupled with the communication module 205 to generate and send notifications of potential security issues/risks once the processing module determines such risks exist. Furthermore, the notification module 211 may also notify attestation participants that actions are required to verify, change, remove, and/or add data flows.

The data flow platform 101 further provides an aggregation module 213, which aggregate contextual alerts related to the use, storage, transmission, deletion, or processing of data (e.g., aware of the fact that customer credit card data resides in a document) from multiple sources, including, but not limited to, Data Loss Prevention (DLP) solutions, data inventory solutions, asset management solutions, data classification solutions. Moreover, the aggregated alerts are compared against certain information (e.g., potentially corresponding data flow steps) within the database 121, which retains a registry of known business processes. For instance, the data flow platform 101 monitors the aggregated plurality of processing nodes (based on actual data use throughout the enterprise) for deviations from the registry of approved or recognized processing nodes for various lines of business. Additionally, the data flow platform 101 identifies and reports a potential security issue when a processing node is not recognized as being part of the processing node registry for known business processes. These processes of aggregation and matching are further detailed with respect to FIGS. 5 and 6.

According to another embodiment, the data flow platform 101 includes a survey module 215 that generates questionnaires or surveys to elicit feedback from data owners to assist with determining an activity's legitimacy or determining that the activity is an anomalous one. This capability is further explained with respect to FIG. 7.

As shown, the data flow platform 101 provides for an approval/veto module 217, which permits the manual override of certain determinations by the data flow platform 101.

A reporting module 219 supports the various modules 201-219 to generate reports to accompany the associated functionalities. For example, the aggregation module 213 may require the creation of a report on the data interactions across the different monitoring systems that provide the alerts. The reporting module 219 can provide default or standardized reports as well as customized reports as it relates to parameters and format.

Figure 3:
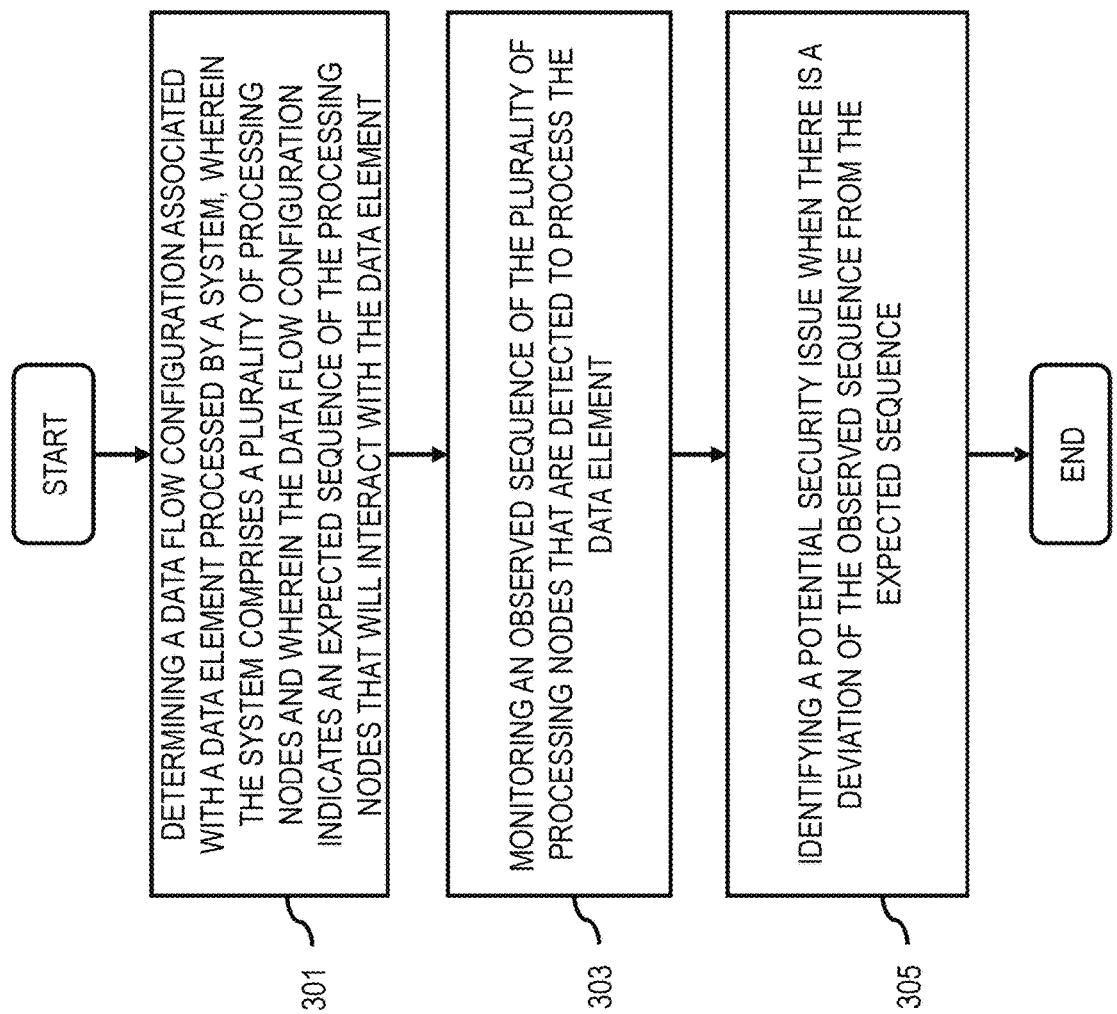
FIG. 3 is a flowchart of a process for data risk management, according to one embodiment.
Figure 4:
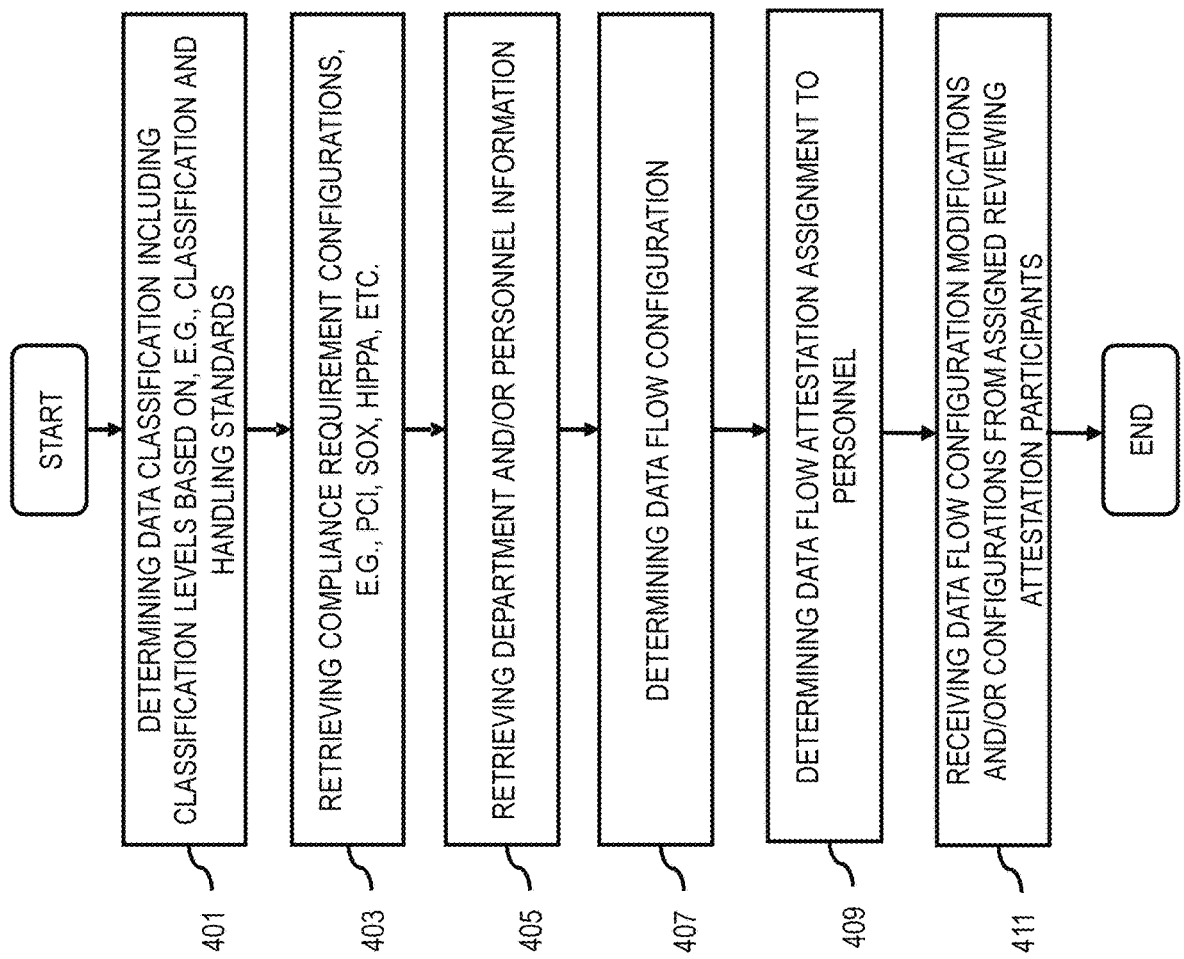
FIG. 4 is a flowchart of a process for data risk management by configuration of data flows, according to one embodiment.
Figure 7:
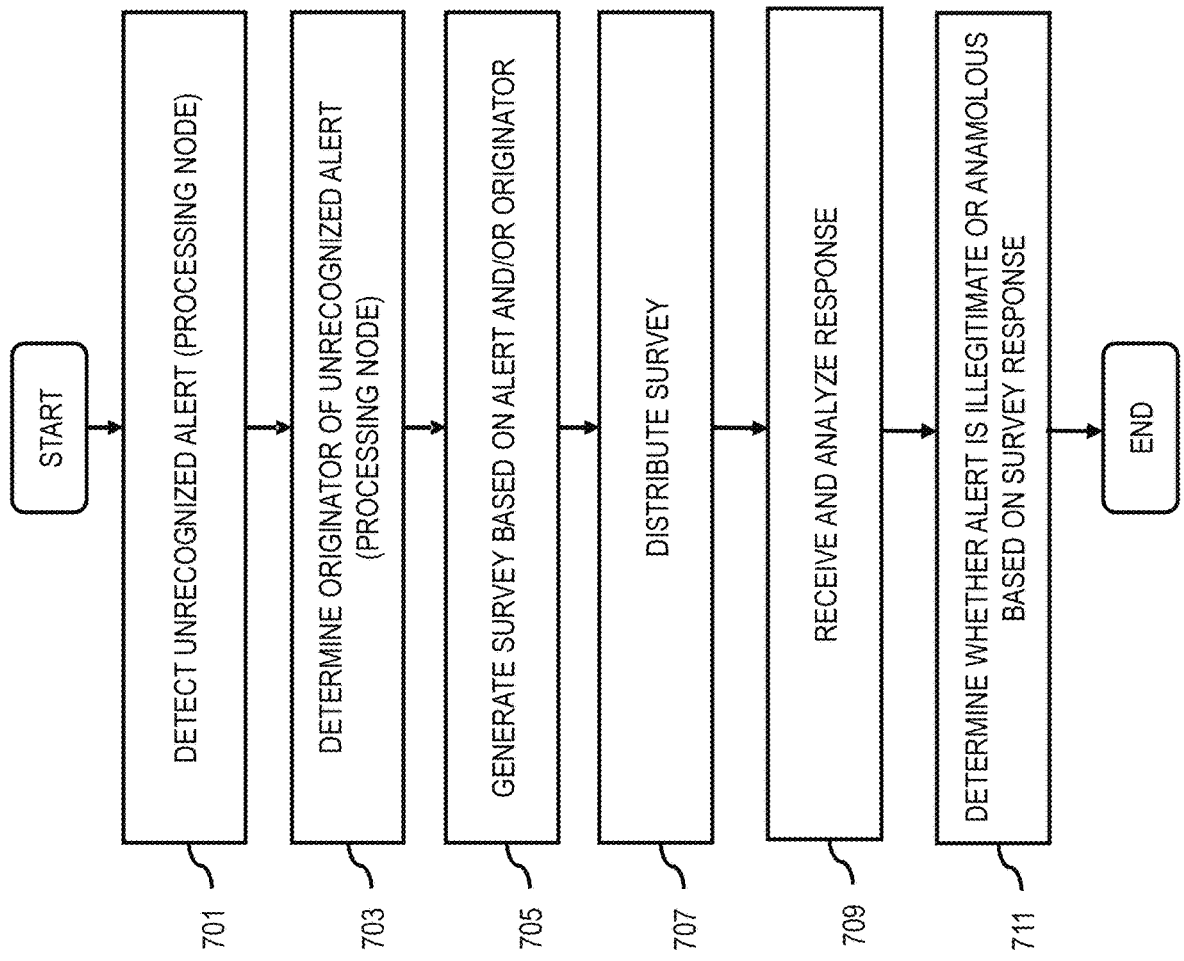
FIG. 7 is a flowchart of a process for generating and distributing surveys to assist with determining illegitimate or anomalous activity, according to one embodiment.

An exemplary method in accordance with methods and processes of embodiments is shown in FIGS. 3 and 4, the methods usable with systems configured as shown, for example, by way of system 100 in FIG. 1. In particular, FIGS. 3 and 4 show data security management methods. FIG. 3 is a flowchart of a process for data risk management, according to one embodiment. In one embodiment, the data flow platform 101 performs the process 300 and is implemented in, for instance, a chip set including a processor and a memory as shown in FIG. 7. In step 301, the data flow platform 101 determines a data flow configuration associated with a data element processed by a system, wherein the system comprises a plurality of processing nodes and wherein the data flow configuration indicates an expected sequence of the processing nodes that will interact with the data element. The data flow configuration establishes data flows based on, personnel, department, data element, system nodes, data types, data classification, data compliance policies, attestation, sequence, data use, node relationships, node capabilities, etc. The system nodes may include departments (e.g., human resources, accounting, IT, etc.), personnel, vendors, clients, etc. of the enterprise. In some embodiments, the system nodes may also include simple servers, endpoint devices, etc. Additionally, the expected sequences may include ranges or variations of personnel, department, data element, system nodes, data types, data classification, data compliance policies, attestation, sequence, data use, node relationships, node capabilities, etc. allowed/expected as part of the expected sequence. For example, an expected sequence may include multiple data classifications such as allowing low and medium classification data within the data flow.

The process continues to step 303 in which the data flow platform 101 initiates a monitoring of the system for an observed sequence of the plurality of processing nodes that are detected to process the data element. The data flow platform 101 tracks/monitors the data types/elements and their movement/use, as well as, method of transport, sensitivity level of the data, compliance requirements for the data, policies and standards changes, etc. And finally, the process continues to step 305 in which the data flow platform 101 identifies a potential security issue when there is a deviation of the observed sequence from the expected sequence.

FIG. 4 is a flowchart of a process for data risk management by configuration of data flows, according to one embodiment. In step 401, determining data classification including classification level assignment. The classification levels may be based on classification and handling standards. Such classification levels may be determined by the data elements/types being monitored and/or established based on regulations/standards applied. Next, step 403, includes retrieval of compliance requirements configurations. The compliance requirements may be based on enterprise requirements. For example, PCI, Sarbanes-Oxley (SOX), or Health Insurance Portability and Accountability (HIPPA) requirements may apply to data handled by a particular enterprise. The compliance requirements may be retrieved from various databases or as selected by and retrieved from customer organization databases 117. In step 405, the data flow platform 101 retrieves organizational structure data and personnel data from databases 111 and 113 for application to system node assignments and attestation of data flows. Known organizational structures and personnel allow for better visualization of adherence/compliance with policies, regulatory recommendations, standards, and application to enterprise processes. Finally, steps 401 through 405 may additionally be newly inputted and stored by administrators of the data flow platform 101.

In step 407, the data flow platform 101 may determine a data flow configuration. Such determinations may be made by administrator/attestation participants or the platform 101 itself based on the previously collected and determined information of at least steps 401 through 405. Next, in step 409, data flow attestation(s) may be assigned to one or more personnel. Data flow attestations may be communicated to the personnel, or the system may be configured to notify the assigned personnel concerning open attestations, or data flow attestations to be completed. Subsequently, in step 411, data flow configuration modifications or confirmations input by assigned reviewing personnel attestation participants may be received.

The data flow steps, data flow, or related information (e.g., alerts) may then be processed to determined and identify risk to data passing through the data flow. Risk identifications may be output, for example, in the form of a list or report. The risk identifications may be presented by textual and/or graphical display to a user. Open attestations or confirmed attestations, or other attestation status may be displayed to a user. Accordingly, data risk may be effectively assessed and managed in view of various requirements, policies, and personnel associated with an enterprise and the data handled by the enterprise.

Figure 5:
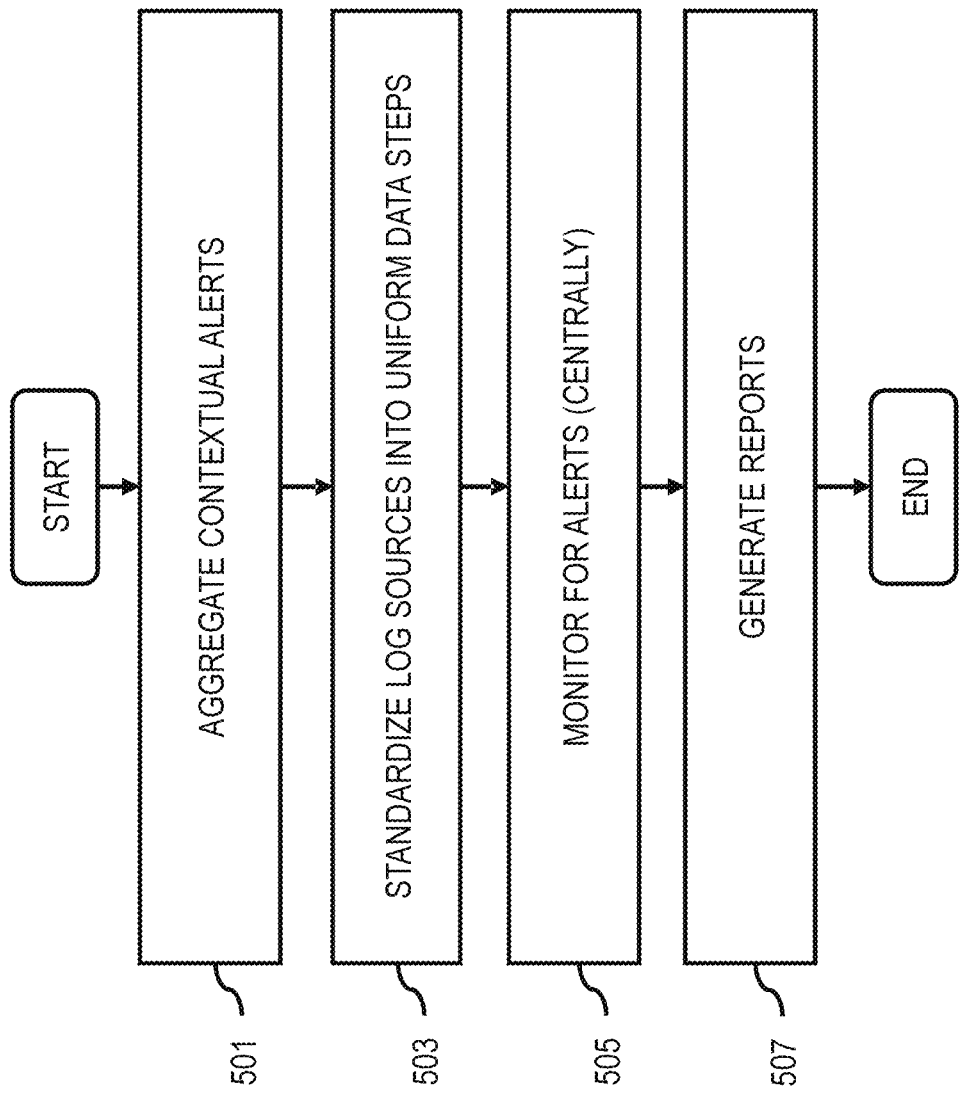
FIG. 5 is a flowchart of a process for aggregating data loss prevention (DLP) alerts into a single intelligence source, according to one embodiment.

FIG. 5 is a flowchart of a process for aggregating data loss prevention (DLP) alerts into a single intelligence source, according to one embodiment. As data protection capabilities grow in demand, while security budgets may not keep pace with such growth, security platforms need to add data protection or data classification capabilities into its core capability set or offering; such offering can be termed "Channel DLP solution." Such channel DLP system can provide email protection and filtering capability that is customizable. A combination of dedicated DLP solutions (e.g., Symantec™, McAfee®, ProofPoint™, Digital Guardian™) as well as channel DLP solutions (e.g., O365™, Proofpoint™, Ironport™) can be implemented, depending on costs, technical complexity, as well as the chronology of when certain IT infrastructure have occurred.

In addition to state-of-the-art DLP capabilities, the data flow platform 101 can advantageously enable enterprise visibility into sensitive data landscape regardless of what DLP solution (channel and/or dedicated) the user/customer has chosen. The data flow platform 101 can import all available log data that provides information related to the transmission, storage, use, processing, or deletion of data. Unlike traditional systems, the data flow platform 101 can be separate from DLP, whereby the intelligence information is gathered and standardized data flow repository may be applied to any replacement or additional DLP solutions, thereby providing the benefit of reduced vendor lock-in risk.

According to process 500, the data flow platform 101 permits, via the aggregation module 213, aggregation of contextual alerts related to the use, storage, transmission, deletion, or processing of data from multiple sources, including DLP monitoring products, Data Inventory scanners, or User Behavioral Analytics systems/solutions, asset management systems/solutions, and/or data classification systems/solutions, per step 501. That is, the DLP alerts can originate from disparate DLP sources and be collected and clustered into a single intelligence source. Such aggregation capability can advantageously enable consistent central analysis, management, and reporting.

The data flow platform 101 further standardizes or homogenizes, as in step 503, the aggregated alerts (e.g., log sources) into distinct but uniform data flow steps that include, by way of example, one or more of the following parameters: Source address, Destination address, data, transmission or protection protocol, frequency, and comments. In step 505, the data flow platform 101 provides centrally monitoring of the disparate monitoring systems and responding consistently to such systems.

Per step 507, this standardized form permits the data flow platform 101, via the reporting module 219, to centrally generate diagrams from, request and manage responses to, or query these alerts regardless of the system that generated them, and enables the generation of cross solution data flow analysis. As noted, reporting on the data interactions can be across disparate monitoring systems—e.g., such as DLP monitoring products, Data Inventory scanners, and User Behavioral Analytics systems. The data flow platform 101 is also able to take the standardized alerts and group them into distinct business processes and to do so across multiple data protection solution sources.

This centralization, according to one embodiment, enables administrators of the data flow platform 101 to request and manage feedback from end users related to their data flow steps across multiple data protection solution sources in a single uniform request.

Figure 6:
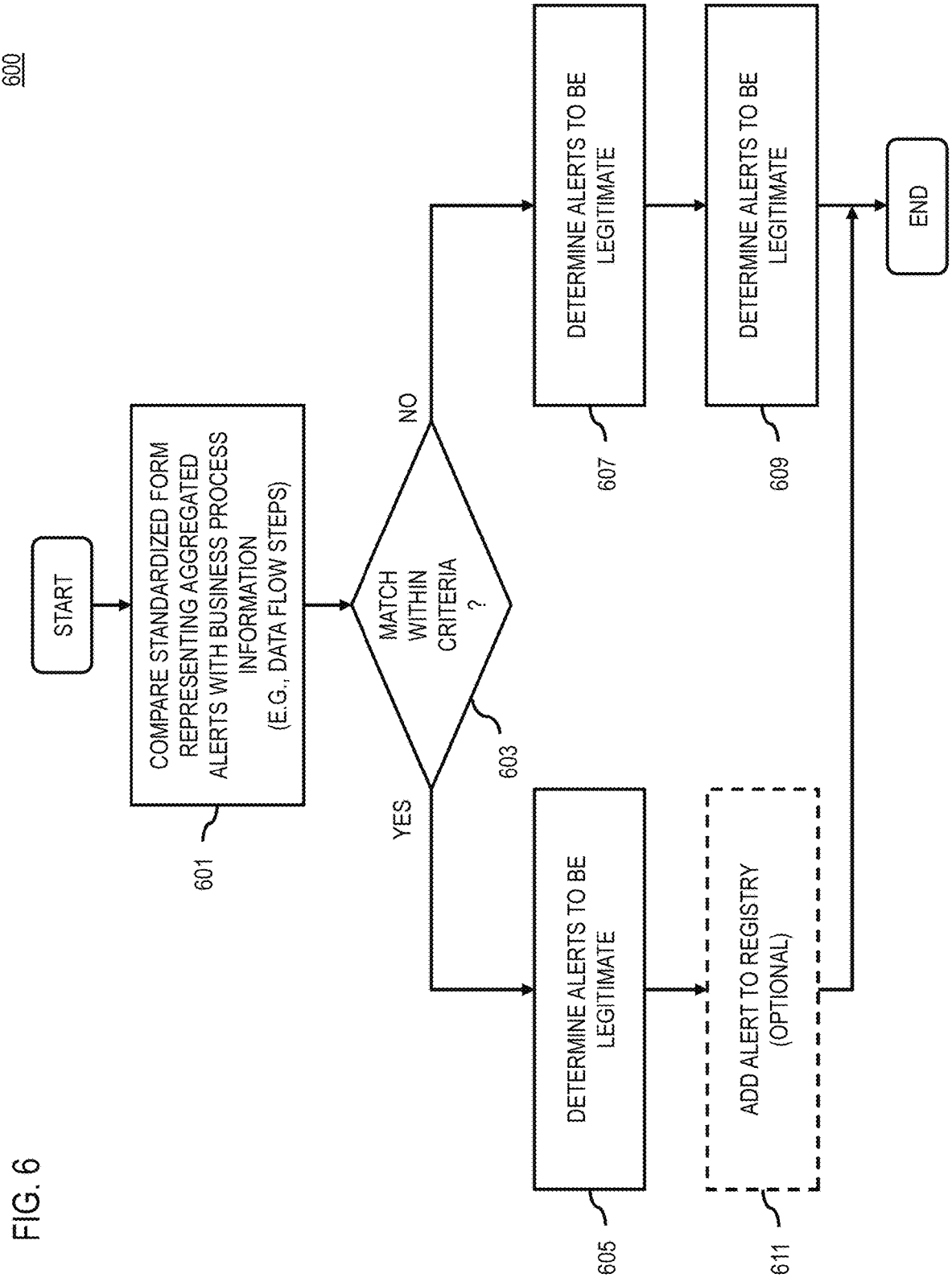
FIG. 6 is a flowchart of a process for matching aggregated DLP alerts against a registry of business processes, according to one embodiment.

FIG. 6 is a flowchart of a process for matching aggregated DLP alerts against a registry of business processes, according to one embodiment. Conventionally, DLP alert management is a high cost and fairly manual task. As a result, organizations typically have dedicated internal or external resources to execute, or simply do not perform DLP alert management at all. Much of DLP alert management is repetitive and manual. Moreover, this labor intensive task in combination with the high personnel turnover associated with such skillset and resource can result in designating every alert received as a new alert, thereby wasting resources and time.

In contrast, the data flow platform 101 not only facilitates the management of business data flow, but leverages the standardized data flow modeling methodology, which enables each identified alert to be compared to the existing library of business data flow. That is, when data protection system alerts are imported to the data flow platform 101, because of the standardization discussed with respect to process 500 in FIG. 5, the data flow platform 101 is able to compare each of these alerts with the existing library of known business process data flow stored within database 121.

According to one embodiment, by executing process 600 the data flow platform 101 transforms the logs into the standardized form used for data flow modeling. The standardized form, in one embodiment, can represent the aggregated alerts as data flow steps. In this way, the data flow platform 101 is able to query across every single registered data flow step (as stored within database 121) to determine whether or not this is a match (as in steps 601 and 603). Namely, each alert is compared to the enterprise data flow library, and where matches are found (i.e., alert is identified as known), follow-up is not necessary, saving the time of the security operations team, as well as the user or system generating the alert.

According to certain embodiments, the match logic is customizable and can be based on one or more criteria. Such criteria can specify a match of certain ones of the following metadata, for instance: sender, recipient, sender department, recipient department, data element, and/or transmission, storage, deletion, processing method. Where a "match" is identified, the data flow platform 101 concludes to a reasonable degree of certainty, that such an alert (or data flow) is part of a known business process, per step 605. However, if no "match" is found, the data flow platform 101, per step 607, determines, to a reasonable degree of certainty, that such an alert is not business sanctioned, and requires follow-up. That is, the data flow platform 101 can initiate inquiry of the alert (as in step 609), as there is a potential security issue.

By way of example, new DLP alerts or data flow steps, for which "matches" do not exist, can trigger a manual follow-up by a security operator. However, once the data flow step has been analyzed and understood, and a response has been provided from the end-user that generated the alert, the data flow platform 101 may categorize the data flow step, add this new alert to the existing repository (i.e., database 121) of business data flow (per step 611), thereby enabling automated processing for future matches (the next time that the business process is executed).

FIG. 7 is a flowchart of a process for generating and distributing surveys to assist with determining illegitimate or anomalous activity, according to one embodiment. Under this scenario, the data flow platform 101 can collect alerts (e.g., data protection solution alerts), and generate one or more surveys or questionnaires for more accurate analysis of the alerts. According to process 700 of FIG. 7, an unrecognized alert (or processing node) is determined, as in step 701. Next, the originator of the alert (or processing node) is identified or otherwise determined, as in step 703. One or more surveys or questionnaires are automatically generated, per step 705, based on the alert and/or originator. The survey is then distributed, as in step 707. By way of example, the survey can be sent via email or other means (e.g., file transfer, instant messaging, etc.) to the end-user responsible for generating the alert. In one embodiment, a single survey is generated for each end-user or department from which the administrator or security operations resource (associated with the data flow platform 101) desires to gather information. For instance, the survey can specify all alerts relevant to the recipient of the survey across the multiple data protection solution sources. Table 1 below provides some questions that can be part of the distributed survey to gather key information relating to the alert:

TABLE 1

| Reference Number | Question |
|---|---|
| 1 | Is the log a true or false positive? |
| 2 | Is this part of a business process? |
| 3 | How often will this take place? |
| 4 | Is the data needed, or can it be removed? |

The survey, formed by the questions of Table 1, can a customizable list from which questions may be added or removed to help determination what to do with the sensitive data in question (in the case of data protection).

In step 709, the user (e.g., originator of the alert) can reply to the survey, so that the data flow platform 101 can receive and analyze the response (i.e., completed survey). Next, in step 711, the data flow platform 101 determines whether the subject alert is illegitimate or anomalous based on the survey response. The survey can be used solely for this analysis or as a supplemental analysis tool to those methods previously described.

It is noted that in data protection systems, thousands of alerts are generated per month within the enterprise. Conventional systems may include notification features, but with little or no capability to enable users to log in and provide answers directly into the DLP solution. The data flow platform integrates a questionnaire directly in the data protection solution that directly builds, modifies, and updates the data flow library.

Figure 8:
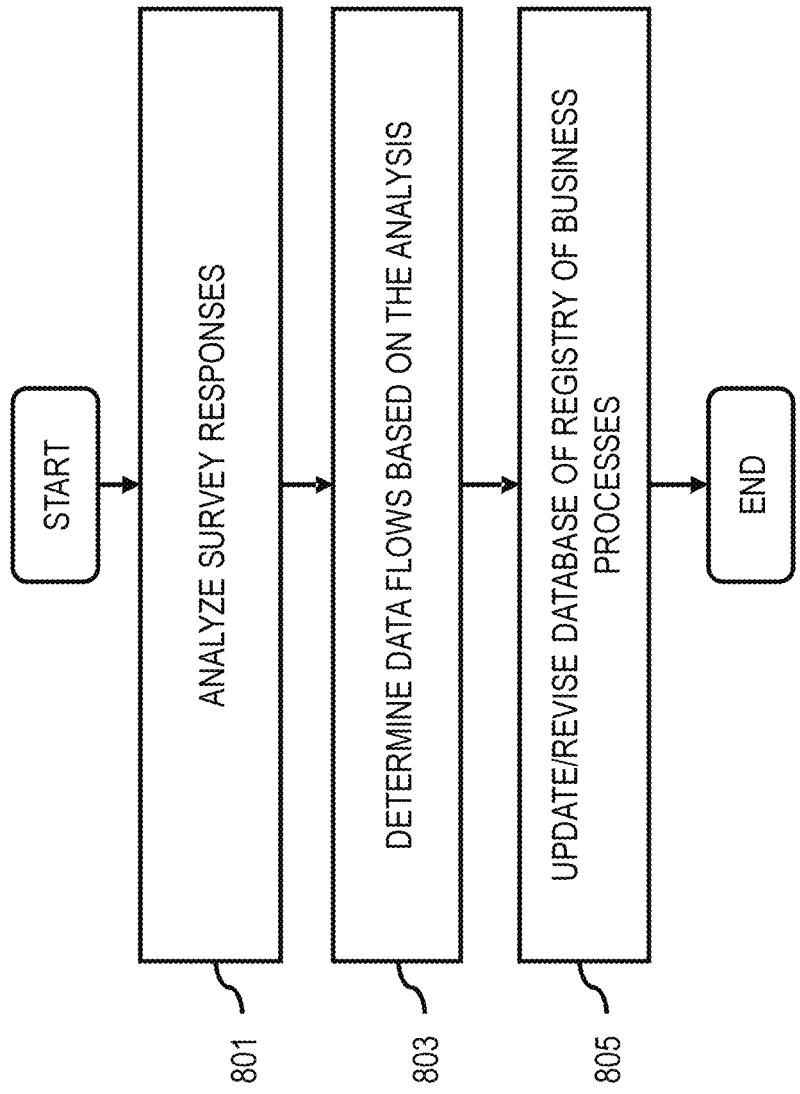
FIG. 8 is a flowchart of a process for updating current knowledge base of business process and data inventory based on survey responses, according to one embodiment.

FIG. 8 is a flowchart of a process for updating current knowledge base of business process and data inventory based on survey responses, according to one embodiment. Per process 800, upon receiving the survey responses, the data flow platform 101 analyzes the responses to determine any appropriate data flow stemming from such feedback from the data owners, as in steps 801 and 803. Next, the data flow platform 101 updates or revises (e.g., adding or deleting) the data flows stored in the database 121, as in step 805. In effect, the data flow platform 101 can add unrecognized processing nodes to the business process specific registry found.

As described previously, in the case of data protection, the logs are imported into the data flow platform 101, as part of the process to compare these alerts to the business data flow library. When the data flow platform 101 imports an alert that is unrecognized, the end user responsible for generating the data flow is engaged via survey to gather additional information about the alert. Through this process, the data flow platform 101 may determine that the interaction is a new or previously unregistered part of a business process. In such a case, the data flow platform 101 automatically appends the new processing node to the end of the corresponding business process ("sequence of processing nodes"); this has the result of keeping these business processes themselves updated for later review and confirmation by the relevant data owner.

In another embodiment, the timestamps associated when each data flow step match are tracked. Accordingly, the data flow platform 101 enables the grouping and sequencing of individual data flow steps (i.e., "processing nodes") into distinct business processes. By coupling the timestamps and the business processes together, in the positive case, the data flow platform 101 can reveal which steps in the data flow were recently matched, and how many times a match was identified in a given span of time. In the negative case, the data flow platform 101 shows for a given business process the steps in the data flow that were never matched or rarely matched over a given span of time.

With respect to DLP alerts, initiatives to understand and document business processes, and ascertain alignment to security control requirements are typically undertaken by a different group than the team responding to DLP alerts. However, because of the metadata each of these two goals have in common, the data flow platform 101 can leverage DLP solutions, and the resources invested to process DLP alerts, to have the additional benefit of keeping the business process library up to date. Because DLP generates alerts in response to data stored process or transmitted, and the data flow platform 101 transforms these alerts into standardized data flow steps, the data flow platform 101 can advantageously use these alerts to keep a given business process up to date with existing practices, and make determinations regarding the currency (or lack thereof) of given steps of the process.

Figure 9:
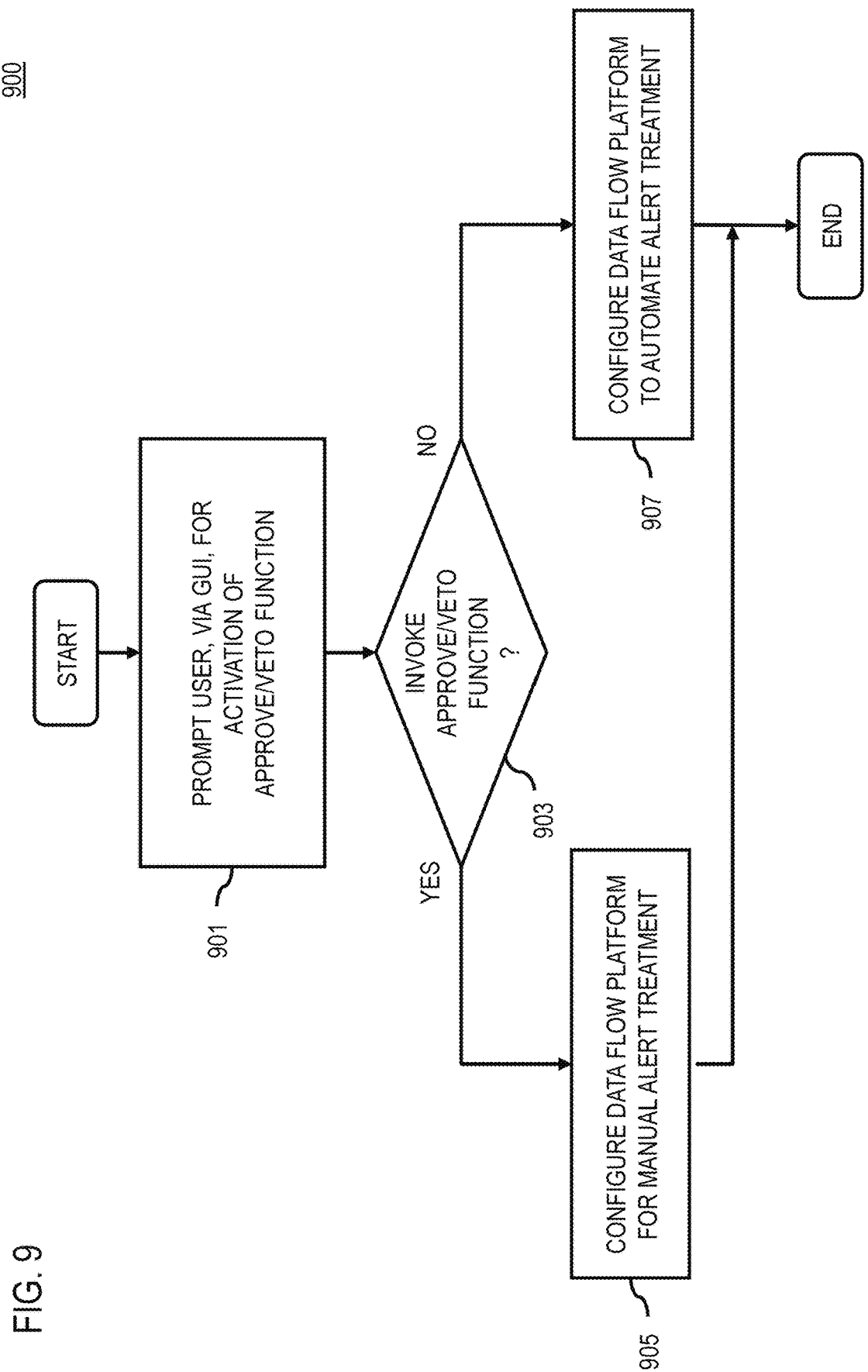
FIG. 9 is a flowchart of a process for applying survey responses using an approve/veto mechanism, according to one embodiment.

FIG. 9 is a flowchart of a process for applying survey responses using an approve/veto mechanism, according to one embodiment. When a match is identified (as in process 600 of FIG. 6), rather than requiring manual processing by both the security operations team and the end-user responsible for generating the alert, the data flow platform 101 enables the response previously provided to be applied to matching alerts going forward—i.e., identified in the future. The data flow platform 101, thus, automates or replays the previous response when a given imported alert is determined to be a match. It is noted that an alert may be a false positive, and the end-user may have provided survey responses that indicate that the alert is a false positive. Consequently, the next time a matching alert is processed by the data flow platform 101, the data flow platform 101 can designate the alert as a false positive without involvement from the security operations team or the end user. This automated processing may be configured to require the end user and/or the security administrator to "opt-in." That is, the data flow platform 101 can provide an approve/veto mechanism for the automated processing to override the automated treatment of the alert; in such a case, the alert can be scrutinized further for treatment by the security operations team, as shown in FIG. 9.

According to process 900, in step 901, the user is prompted via a graphical user interface on their user equipment to activate the approve/veto function. If the user specifies that the approve/veto function should be invoked, per step 903, the data flow platform 101 is configured for manual alert treatment (step 905). However, if the approve/veto function is not invoked, the data flow platform 101 provides an automated alert treatment, per step 907. In this manner, the data flow platform 101 can apply received responses to future survey questions for recognized or similar processing nodes. Prior to automated processing taking place and automation rules being implemented by the data flow platform 101, this mechanism advantageously provides the security operation team (e.g., security analysts and risk analysts) the opportunity to approve or reject survey responses, and associated automation processing rules.

The described process permits security administrators to review, for example, survey responses provided by processing node owners, as well as automated processing conditions. Accordingly, approval or veto actions can be taken to enable "human" intervention in determining whether such actions (stemming from the subject alert(s)) should be implemented. This mechanism, in certain scenarios, may be needed. For instance, when users respond to the surveys and indicate that a certain action is part of a normal business activity, the data flow platform 101 may not have specific information to verify whether the action and associated alert are legitimate; moreover, even if legitimate, the alert may not be in alignment with security control requirements or baselines as set by the security administrators.

Figure 10A:
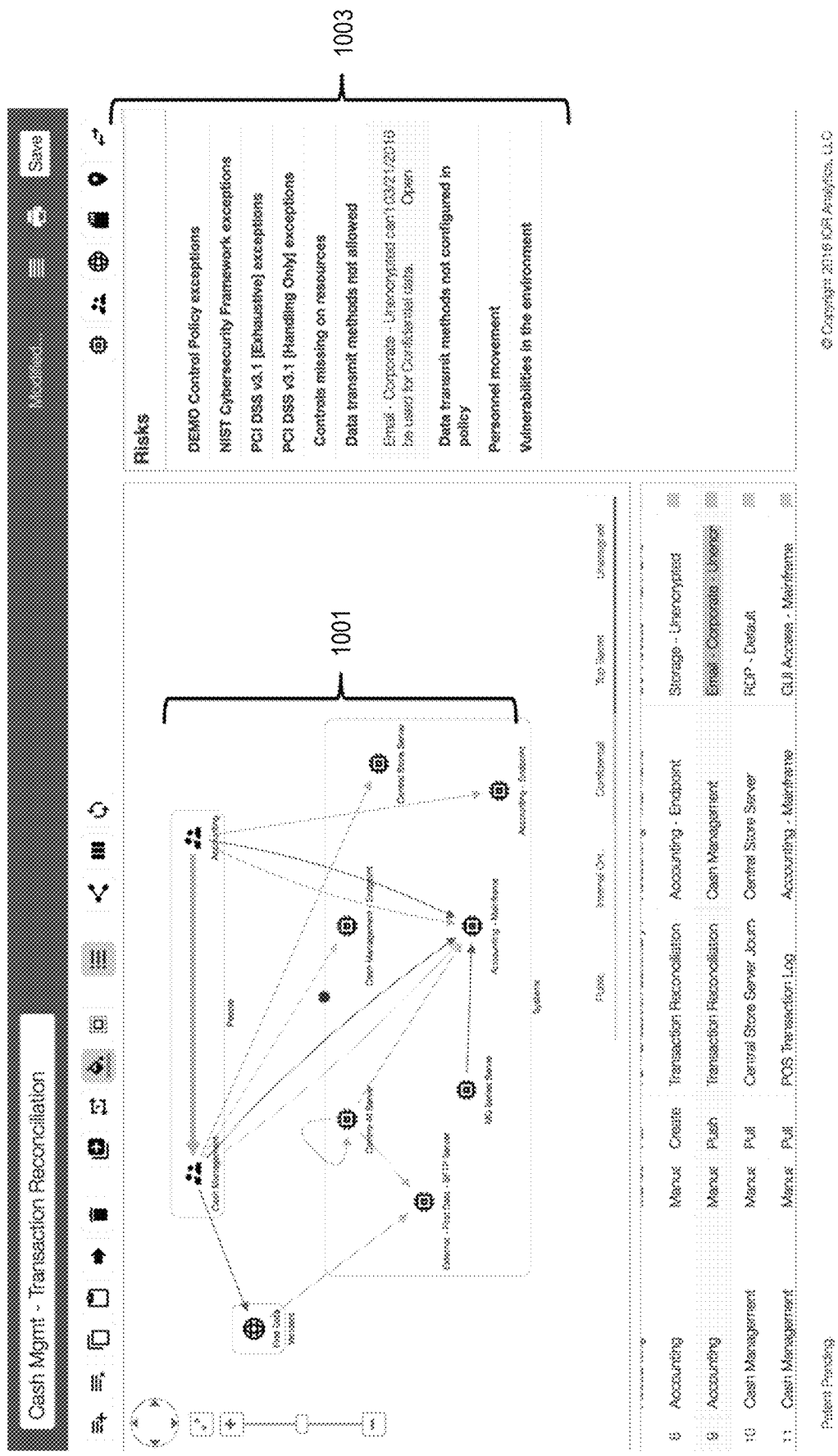

FIGS. 10A-G are diagrams of user interfaces for data risk management, according to some embodiments. FIG. 10A is a diagram of a user interface providing a graphically captured flow of data providing visualization of the data classification level in section 1001, further presenting below such graphical information the captured details of each sequence/step within a flow including the data types/elements, node information, transmission method, etc. The graphical presentation of the data flows makes the visualization of data movement easier. The captured details may further provide greater analysis through a full understanding of the steps involved in each data flow and singular steps may be selected to present a particular flow step, quickly clarifying the data elements/types and nodes involved for a user to determine if a single step or an entire data flow is at issue. Furthermore, section 1003 presents potential security risks and lifecycle issues for the data flows in a tracked list. The presentation of the potential security risks allows for quick determinations of issues and provides easy access to further analysis and addressing of those potential issues.

FIG. 10B is a diagram of a user interface providing an embodiment of a data flow configuration for visualizing, defining, and modifying data flows, including adjustable parameters such as, transmittal methods, data types, action types, events, data resources, as well as further parameters such as systems, departments, vendors, etc. The transmittal method of a node could relate to compliance with regulations, policies, and/or recommendations, as various node capabilities for transmittal may place the data transmitted in a position for potential security risks. Furthermore, the data type/elements may not only determine which nodes and what methods of transmittal may be used, but aid in classification of the data. The actions and events may provide for quick determinations of whether such transmittals are automated, and are pushing or pulling of the data to further present which user/node may be at issue for their use of such actions. Finally, the systems, departments, and vendors may relate to various separations among client systems and further clarify which nodes may be at issue in creating a security risk.

Figure 10C:
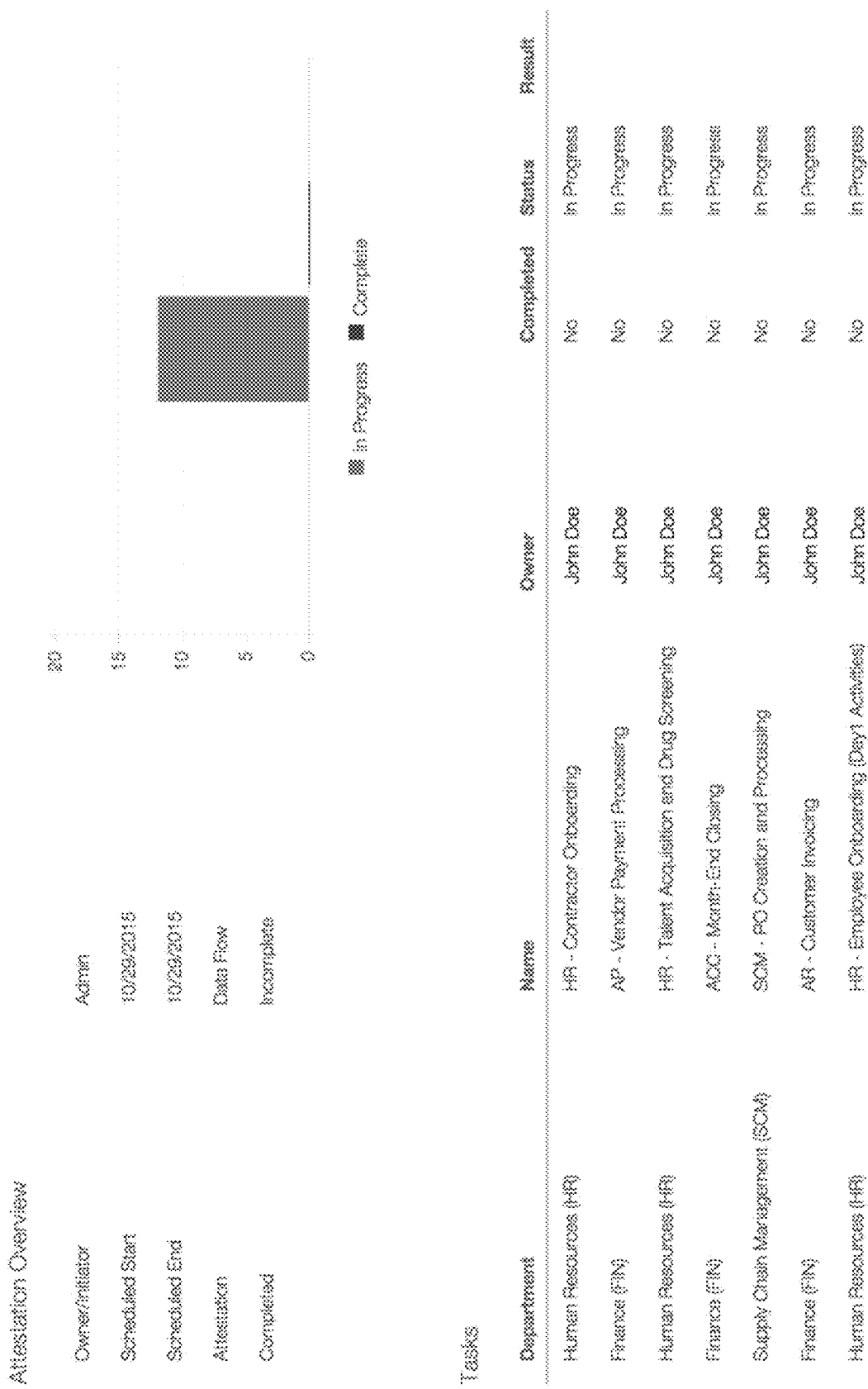

FIG. 10C is a diagram of a user interface providing an embodiment of an attestation overview page. The personnel/department assigned attestation tasks and status and result of such tasks are provided, as well as various metrics related to statistics associated with the attestation tasks. The various metrics may include, for example, the number or percent of in progress or completed tasks assigned. Further, the assigning of the attestation tasks should clearly be to personnel and/or departments for which a data flow configuration and/or data flow is associated. Not only can the data flow configuration be verified, but the monitored/observed data flow may also be verified. Additionally, assignment of attestation tasks may also provide notification and updates of the progress of multiple tasks assigned to the same departments/personnel.

Figure 10D:
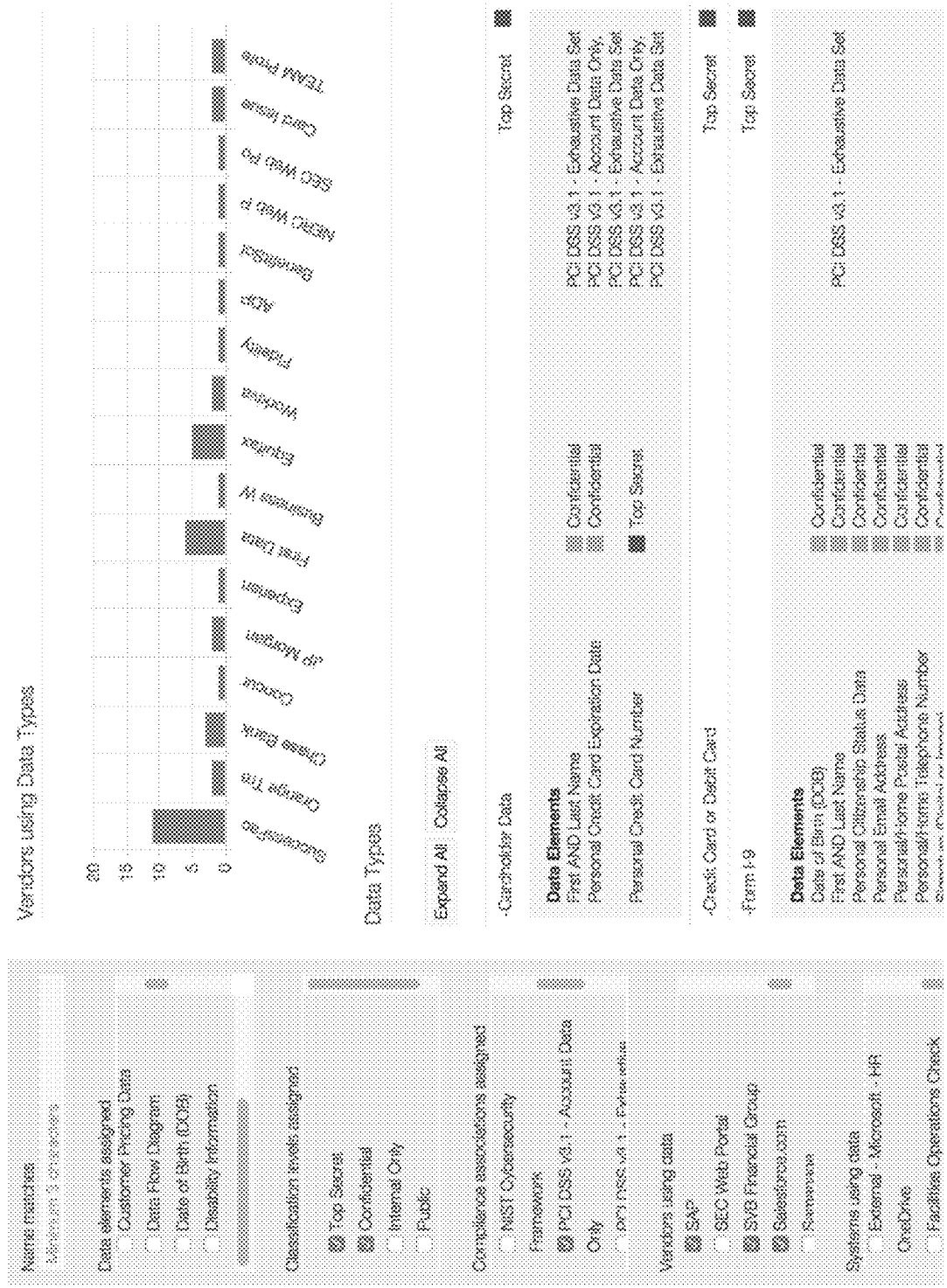

FIG. 10D is a diagram of a user interface providing an embodiment of an overview of data flow information with filtering by various input parameters separated by vendors. Such an overview could also be applied to any node types, such as departments, personnel, etc. This user interface provides for greater understanding and meaning behind the monitored data and facilitates the creation of reports based on the monitored data. Such filtering of the various input parameters may clarify which entities (e.g., vendors, departments, personnel, etc.) may be at issue. Such determinations may be made by filtering out, for example, certain classification data types/elements which are handled, showing certain entities handle more classified information and thus should have stricter transmittal requirements, security protocols, etc. Further examples may include filtering out specific compliance requirements and which entities need to meet those stricter standards.

FIG. 10E is a diagram of a user interface providing an embodiment of classification level configurations. The classification labels, severity/risk levels, and description of such levels are provided. The severity/risk levels provide simpler visualization of the movement of important data with different colors and gradients, as well as providing a way to easily define multiple levels of sensitivity for data of all types/elements. The data types/elements assigned to such classifications may also be included. This description of the data classifications may provide better understanding to future users of how they should classify data elements/types which have previously been unclassified.

Figure 10F:
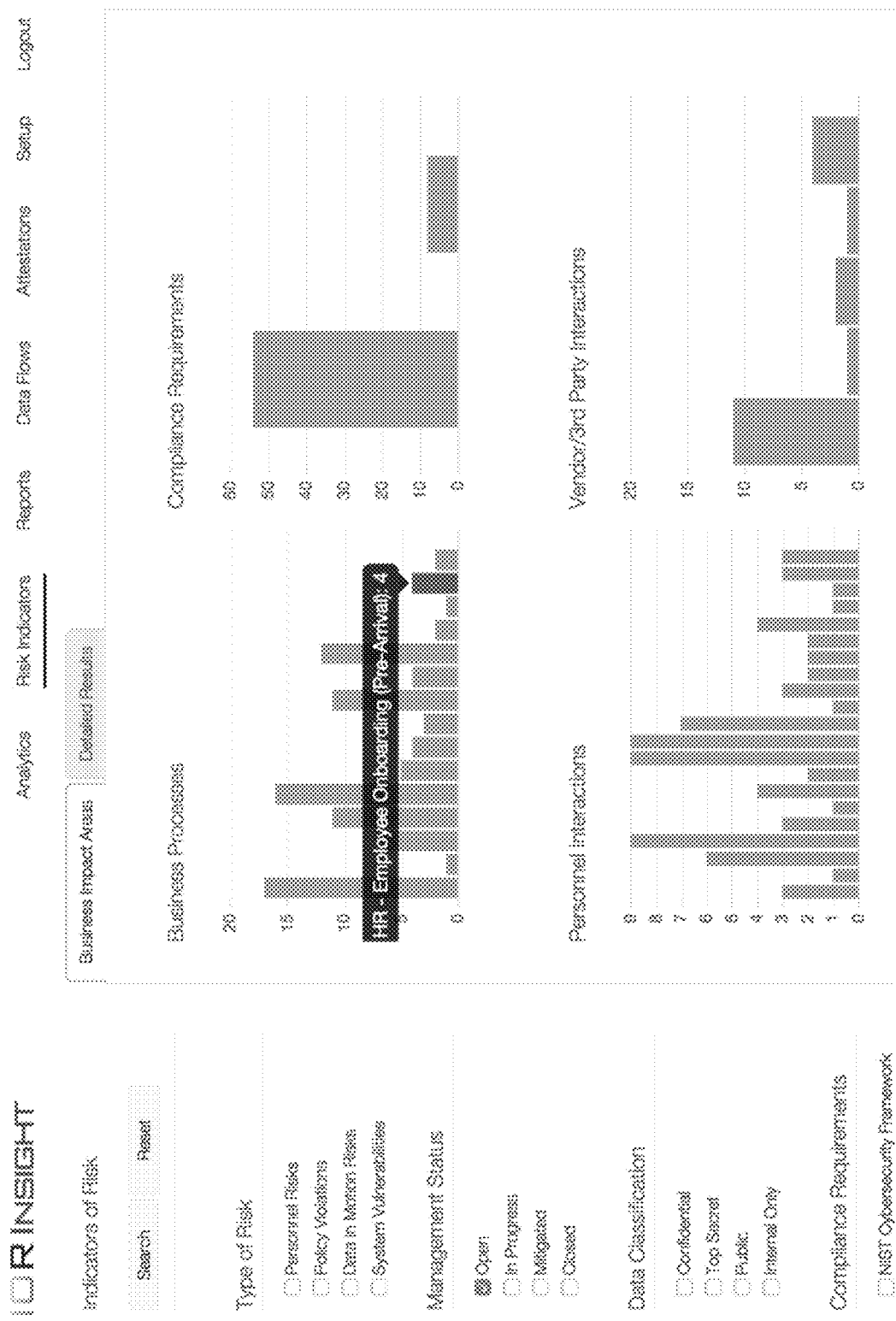

FIG. 10F is a diagram of a user interface providing an embodiment of risk analysis filtering. The security risks/issues are tracked and presented in regards to their status (e.g., whether the issue is being addressed, has been addressed, has not been addressed, or can only be mitigated), risk types (e.g., personnel action risks, policy/compliance violations, transmittal issues, node vulnerabilities, etc.), data classifications, compliance requirements, etc. The visualizations may also more clearly show which business entities are generating the most risks/issues and/or have issues which are being solved.

FIG. 10G is a diagram of a user interface providing an embodiment of data element listing. The data elements/types listed include an assigned classification and description/name of the data element. Such a listing may result in a more effective classification (e.g., choosing a similar classification as a similar data element) of newly added data elements and provide for a clearer understanding of exactly what elements are being defined.

Figure 10H:
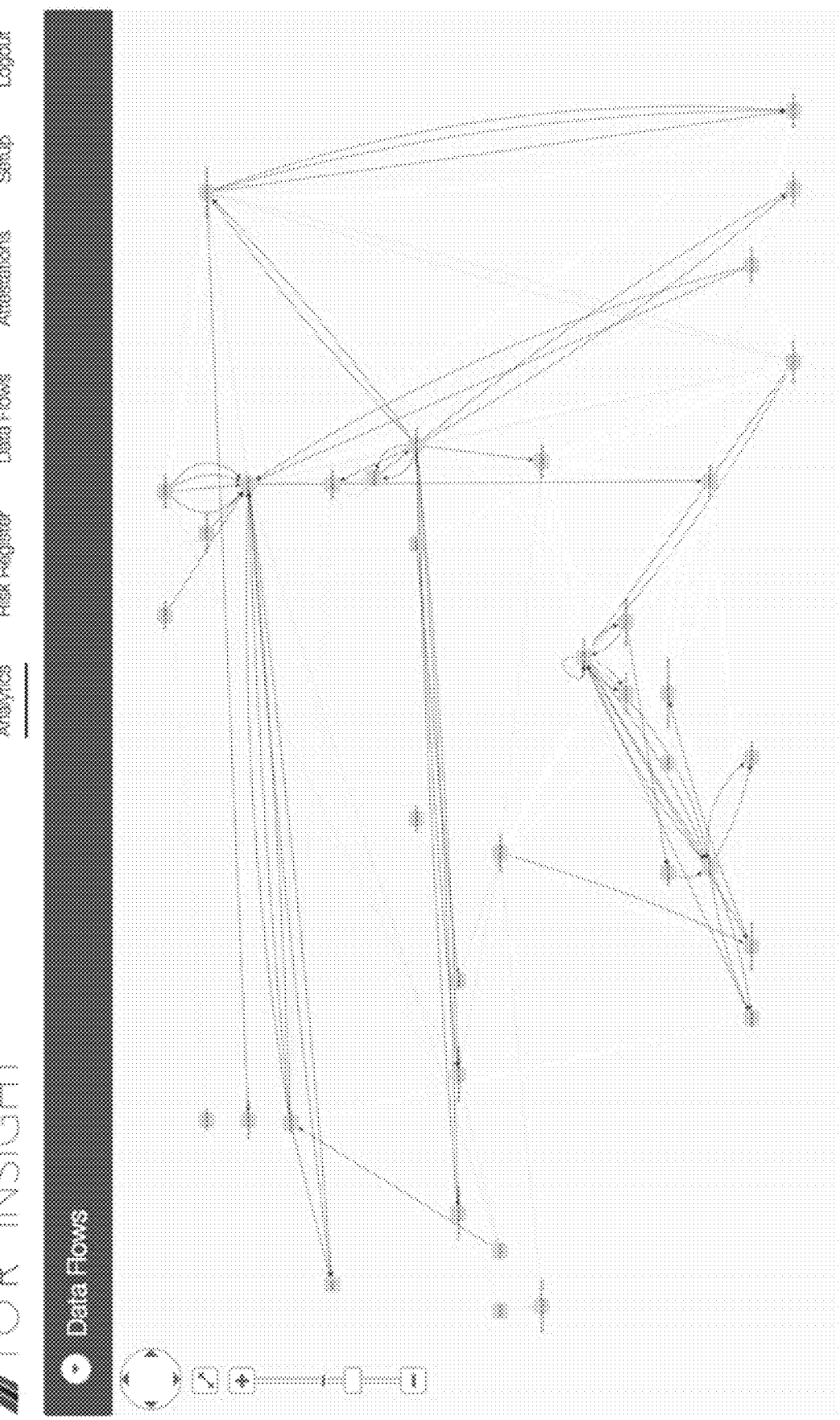

FIG. 10H is a diagram of a user interface providing an embodiment of the aggregated enterprise system data flows. The visualizations combining individual data flows representing the data flows within the system as a whole, may be aggregated into a single view. The single view of the aggregated data flows helps users attain a world view of the entire enterprise. Thus this single view provides a large-scale overview of potential security issues which may not have been captured in other ways. For example, the overview may show certain personnel or departments are using/transporting much more data than would be expected which could indicate a potential data dump and/or improper use of enterprise data. Finally the aggregated data flows may further be manipulated or filtered based on user defined inputs or other search criteria.

Various forms of computer readable media, including non-transitory computer readable media, may be involved in carrying one or more sequence of instructions or data or both to one or more processors for executing methods in accordance with embodiments. For example, instructions and data may initially be carried on a magnetic disk of a remote computer such as host. The instructions may be received or retrieved and executed using some of the data sent with the instructions. The instructions and may optionally be stored on one or more storage devices, either before or after execution by one or more processors.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

The processes described herein for consent document management may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
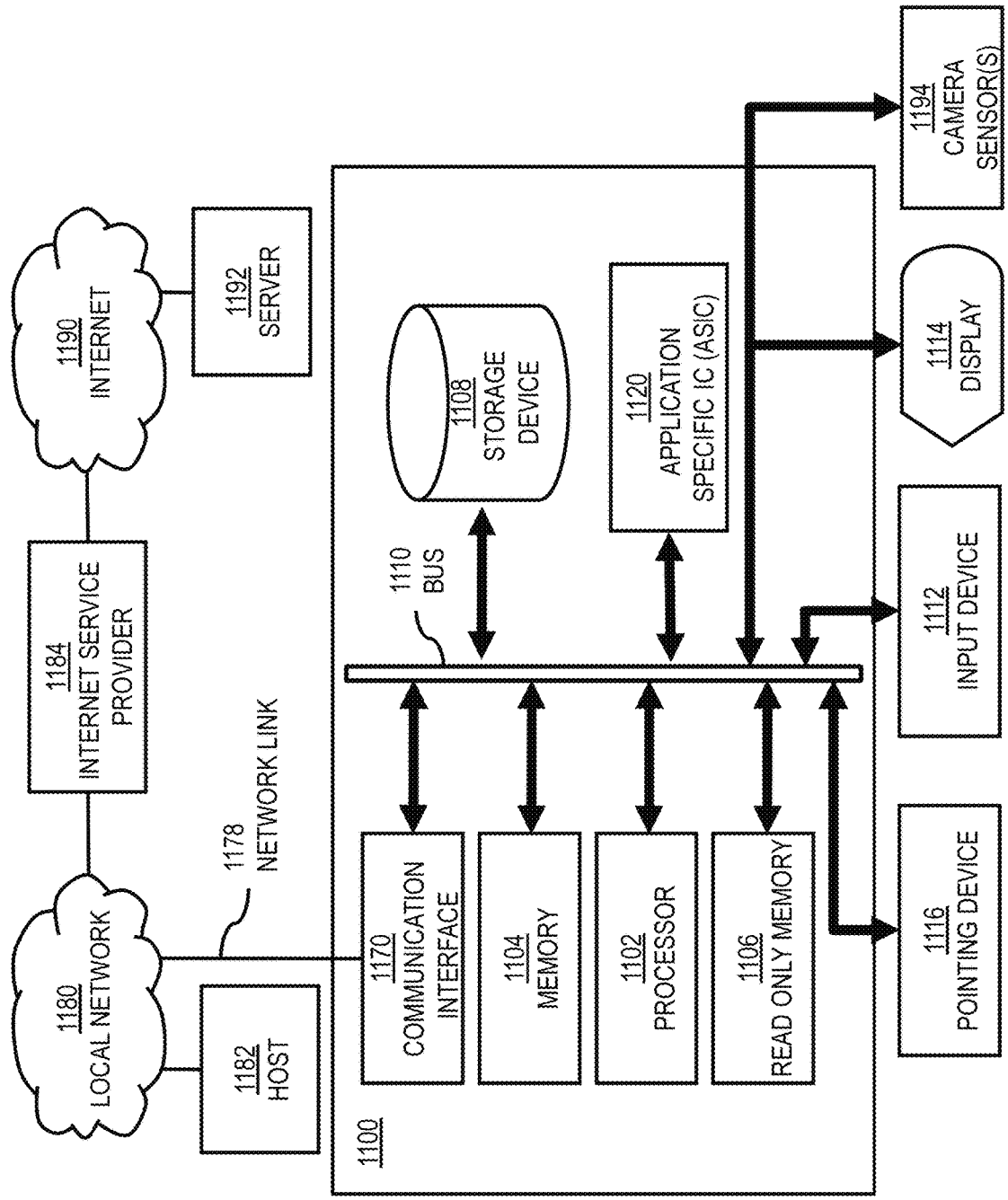
FIG. 11 is a diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to manage consent documents as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of consent document management.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to consent document management. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for consent document management. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for consent document management, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 105 for providing consent document management to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infrared transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

Figure 12:
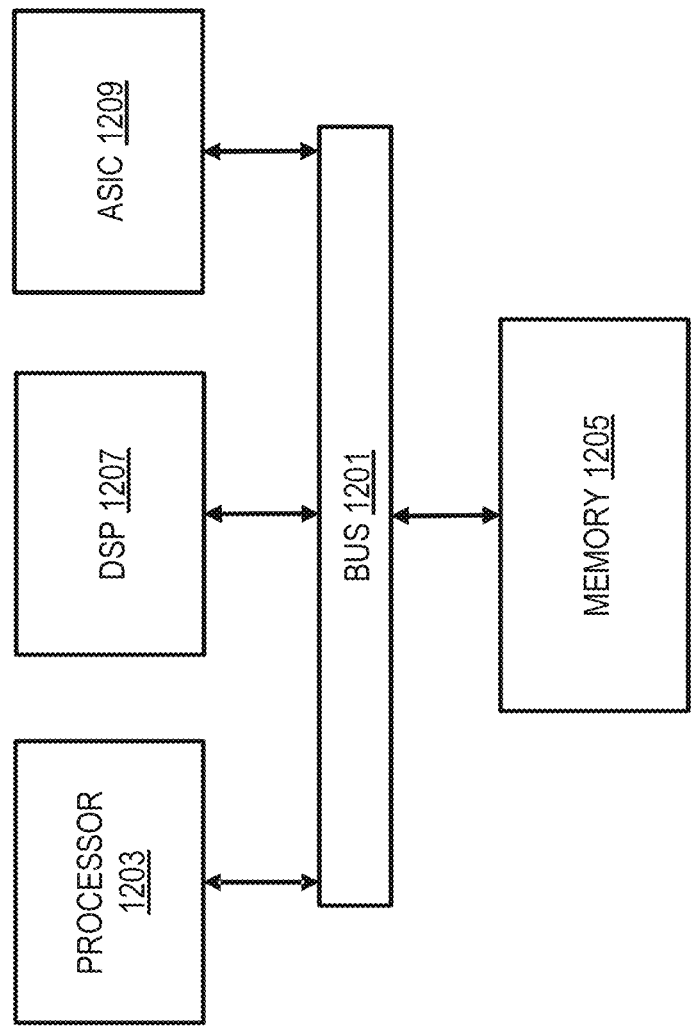
FIG. 12 is a diagram of a chip set that can be used to implement an embodiment of the invention.

FIG. 12 illustrates a chip set or chip 1200 upon which an embodiment of the invention may be implemented. Chip set 1200 is programmed to manage consent documents as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of consent document management.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to manage consent documents. The memory 1205 also stores the data associated with or generated by the execution of the inventive steps.

Figure 13:
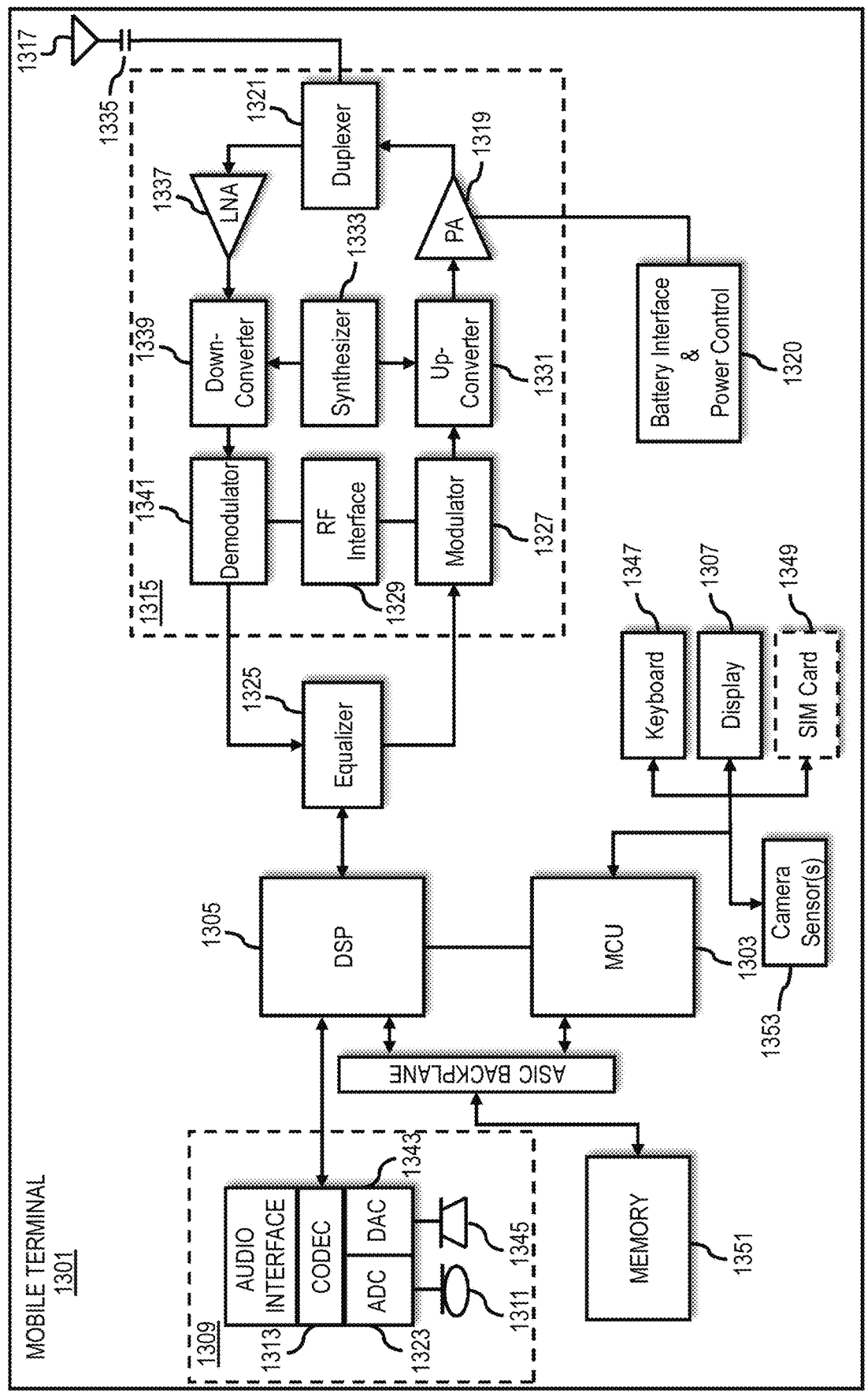
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of consent document management. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of consent document management. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to manage consent documents. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   establishing communication with a plurality of monitoring systems, wherein each of the monitoring systems is disparate from one another;
   aggregating alerts from the plurality of monitoring systems, wherein the alerts relate to use, storage, transmission, deletion or processing of data from the plurality of monitoring systems;
   determining one or more uniform data flow steps by standardizing the aggregated alerts; and
   storing the one or more uniform data flow steps in a central database that is external to the plurality of monitoring systems.

2. The method of claim 1, further comprising:
   receiving a new alert from one of the plurality of monitoring systems;
   determining whether the new alert matches a corresponding known data flow step stored with the central database;
   determining that the new alert is a potential security issue if there is no determined match; and
   selectively adding the new alert to the central database if there is no determined match.

3. The method of claim 2, further comprising:
   applying one or more criteria in the determination of the match, wherein the one or more criteria include a storage, transmission, deletion, or processing method.

4. The method of claim 2, further comprising:
   generating a prompt requesting permission to activate an approve/veto function to provide automated treatment or manual treatment of the new alert;
   initiating presentation of the prompt, via a graphical user interface; and
   selectively activating the approve/veto function based on user input in response to the prompt.

5. The method of claim 1, further comprising:
   generating one or more surveys based on the alerts, wherein the one or more surveys specify one or more questions relating to the alerts;
   distributing the one or more surveys to originators of the alerts;
   receiving responses to the one or more surveys; and
   determining whether the alerts are illegitimate or anomalous based on the received responses.

6. The method of claim 5, further comprising:
   determining a new data flow based on the received responses; and
   updating the central database based on the determination of the new data flow.

7. The method of claim 1, wherein the standardization provides the one or more uniform data flow steps based on one or more parameters that include transmission, protection protocol, frequency, or comments.

8. The method of claim 1, wherein the plurality of monitoring systems includes a data loss protection monitoring product, a data inventory scanner, or a user behavioral analytics system.

9. An apparatus comprising:
   at least one processor; and
   at least one memory including computer program code for one or more programs, the at least one memory and the computer program code configured to, with the at least one processor, cause the apparatus to perform at least the following,
   establish communication with a plurality of monitoring systems, wherein each of the monitoring systems is disparate from one another;
   aggregate alerts from the plurality of monitoring systems, wherein the alerts relate to use, storage, transmission, deletion or processing of data from the plurality of monitoring systems;
   determine one or more uniform data flow steps by standardizing the aggregated alerts; and
   store the one or more uniform data flow steps in a central database that is external to the plurality of monitoring systems.

10. The apparatus of claim 9, wherein the apparatus is further caused to:
    receive a new alert from one of the plurality of monitoring systems;
    determine whether the new alert matches a corresponding known data flow step stored with the central database;
    determine that the new alert is a potential security issue if there is no determined match; and
    selectively add the new alert to the central database if there is no determined match.

11. The apparatus of claim 10, wherein the apparatus is further caused to:
    apply one or more criteria in the determination of the match, wherein the one or more criteria include a storage, transmission, deletion, or processing method.

12. The apparatus of claim 10, wherein the apparatus is further caused to:
    generate a prompt requesting permission to activate an approve/veto function to provide automated treatment or manual treatment of the new alert;
    initiate presentation of the prompt, via a graphical user interface; and
    selectively activate the approve/veto function based on user input in response to the prompt.

13. The apparatus of claim 9, wherein the apparatus is further caused to:

generate one or more surveys based on the alerts, wherein the one or more surveys specify one or more questions relating to the alerts;
distribute the one or more surveys to originators of the alerts;
receive responses to the one or more surveys; and
determine whether the alerts are illegitimate or anomalous based on the received responses.

14. The apparatus of claim 13, wherein the apparatus is further caused to:
determine a new data flow based on the received responses; and
update the central database based on the determination of the new data flow.

15. The apparatus of claim 9, wherein the standardization provides the one or more uniform data flow steps based on one or more parameters that include transmission, protection protocol, frequency, or comments.

16. The apparatus of claim 9, wherein the plurality of monitoring systems includes a data loss protection monitoring product, a data inventory scanner, or a user behavioral analytics system.

17. A method comprising:
assigning a policy to a data element associated with a data flow, wherein the data flow includes one or more data flow steps specifying usage of the data element, the policy being associated with a classification level for the data element;
determining a data flow configuration according to the classification level involving how the data element is processed by a plurality of processing nodes;
determining an expected sequence of the processing nodes that will interact with the data element according to the data flow configuration;
monitoring an observed sequence of the processing nodes based on detected processing of the data element; and
comparing the observed sequence with the expected sequence to identify a potential security issue.

18. The method of claim 17, wherein each flow step specifies method of transport of the data element as part of the policy.

19. The method of claim 17, further comprising:
verifying the observed sequence based on attestation by a user associated with one of the plurality of processing nodes; and
selectively modifying the observed sequence based on the attestation.

20. The method of claim 17, further comprising:
aggregating a plurality of alerts from the plurality of processing nodes; and
standardizing the aggregated alerts to provide uniformity of the data flow steps.

* * * * *